(12) United States Patent
Weinrich et al.

(10) Patent No.: US 10,585,427 B2
(45) Date of Patent: Mar. 10, 2020

(54) HUMAN-MACHINE INTERFACE (HMI) SYSTEM HAVING ELEMENTS WITH AGGREGATED ALARMS

(71) Applicant: AVEVA Software, LLC, Lake Forest, CA (US)

(72) Inventors: Steven Michael Weinrich, York, PA (US); Kenneth Kasajian, Rancho Santa Margarita, CA (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 0 days.

(21) Appl. No.: 16/195,686

(22) Filed: Nov. 19, 2018

(65) Prior Publication Data

US 2019/0339682 A1 Nov. 7, 2019

Related U.S. Application Data

(63) Continuation of application No. 14/198,084, filed on Mar. 5, 2014, now Pat. No. 10,152,051.

(60) Provisional application No. 61/890,607, filed on Oct. 14, 2013.

(51) Int. Cl.
*G06F 15/16* (2006.01)
*G05B 23/02* (2006.01)

(52) U.S. Cl.
CPC .............................. *G05B 23/0267* (2013.01)

(58) Field of Classification Search
CPC ...... G05B 23/0267; H01G 2/08; H01G 4/224; H01G 4/258; H02M 7/003
See application file for complete search history.

(56) References Cited

U.S. PATENT DOCUMENTS

2008/0189368 A1* 8/2008 Rothschild ......... G06Q 30/0623 709/205
2008/0189637 A1* 8/2008 Krajewski ................. G06F 8/36 715/771

* cited by examiner

*Primary Examiner* — Normin Abedin
(74) *Attorney, Agent, or Firm* — Greenberg Traurig, LLP

(57) ABSTRACT

A system manages human machine interface (HMI) applications for industrial control and automation. Software instructions stored on a tangible, non-transitory media and executable by a processor receive data indicative of a manufacturing/process control system being monitored and display a user interface indicative of a status of the manufacturing/process control system being monitored wherein the status is based on the received data.

15 Claims, 20 Drawing Sheets

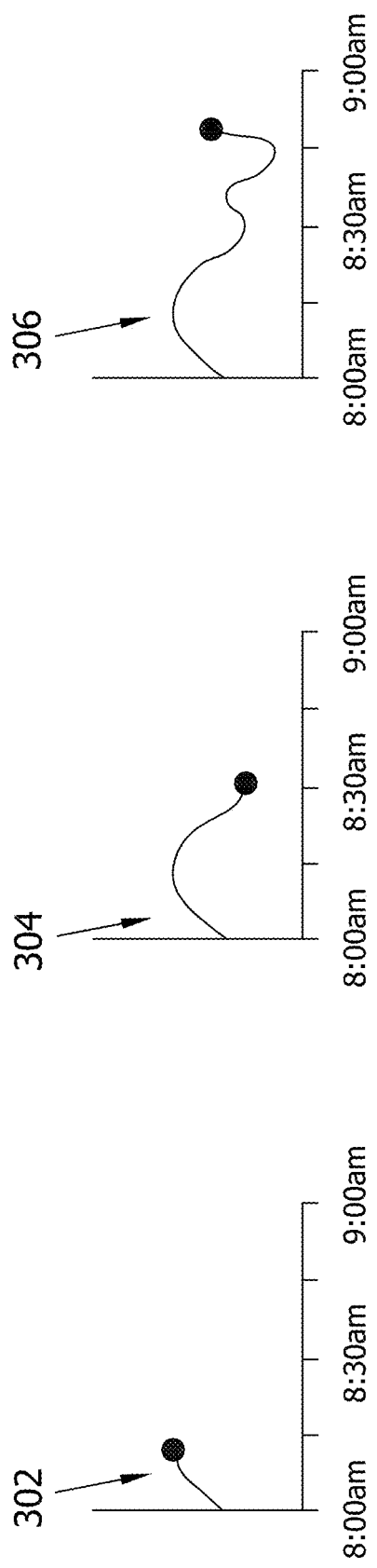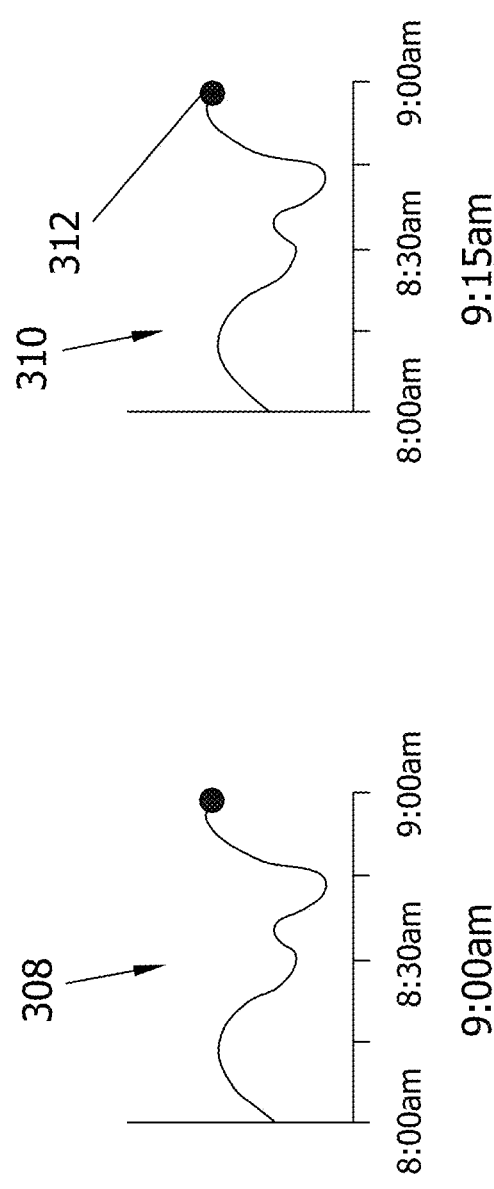

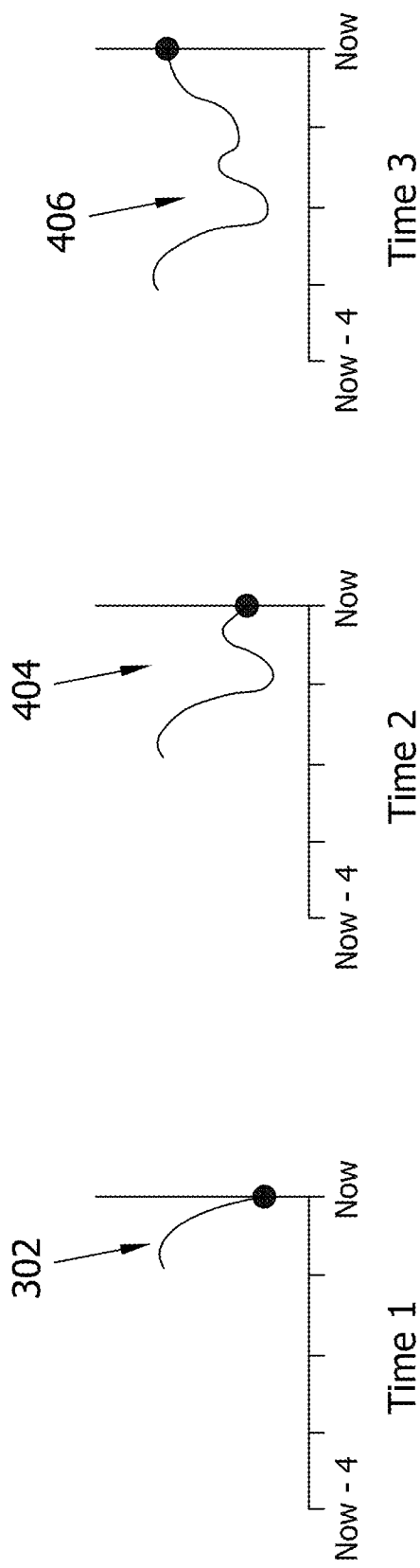
FIG. 4A — Time 1
FIG. 4B — Time 2
FIG. 4C — Time 3
FIG. 4D — Time 4
FIG. 4E — Time 5

HUMAN-MACHINE INTERFACE (HMI) SYSTEM HAVING ELEMENTS WITH AGGREGATED ALARMS

CROSS-REFERENCE TO RELATED APPLICATIONS

This application is a continuation of U.S. Nonprovisional patent application Ser. No. 14/198,084, filed Mar. 5, 2014, which claims the benefit of U.S. Provisional Patent Application Ser. No. 61/890,607, filed Oct. 14, 2013, the entire disclosures of which are incorporated by reference.

BACKGROUND

The present invention generally relates of the fields of networked computerized industrial control, automation systems and networked computerized systems utilized to monitor, log, and display relevant manufacturing/production events and associated data, and supervisory level control and manufacturing information systems. Such systems generally execute above a regulatory control layer in a process control system to provide guidance to lower level control elements such as, by way of example, programmable logic controllers or distributed control systems (DCSs). Such systems are also employed to acquire and manage historical information relating to such processes and their associated output. More particularly, the present invention relates to a human-machine interface (HMI) system for a manufacturing and/or process control system such as supervisory control and data acquisition (SCADA) and/or manufacturing execution systems (MES). Such systems generally execute above/outside of a control layer of a manufacturing/process control system to record production events and related event data and to provide guidance to lower level control elements such as, by way of example, programmable logic controllers.

Industry increasingly depends upon highly automated data acquisition and control systems to ensure that industrial processes are run efficiently, safely and reliably while lowering their overall production costs. Data acquisition begins when a number of sensors measure aspects of an industrial process and periodically report their measurements back to a data collection and control system. Such measurements come in a wide variety of forms. By way of example the measurements produced by a sensor/recorder include: a temperature, a pressure, a pH, a mass/volume flow of material, a tallied inventory of packages waiting in a shipping line, or a photograph of a room in a factory. Often sophisticated process management and control software examines the incoming data, produces status reports, and, in many cases, responds by sending commands to actuators/controllers that adjust the operation of at least a portion of the industrial process. The data produced by the sensors also allow an operator to perform a number of supervisory tasks including: tailor the process (e.g., specify new set points) in response to varying external conditions (including costs of raw materials), detect an inefficient/non-optimal operating condition and/or impending equipment failure, and take remedial actions such as move equipment into and out of service as required.

Typical industrial processes are extremely complex and receive substantially greater volumes of information than any human could possibly digest in its raw form. By way of example, it is not unheard of to have thousands of sensors and control elements (e.g., valve actuators) monitoring/controlling aspects of a multi-stage process within an industrial plant. These sensors are of varied type and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. Multiplying a single sensor/control element by thousands of sensors/control elements (a typical industrial control environment) results in an overwhelming volume of data flowing into the manufacturing information and process control system. Sophisticated data management and process visualization techniques have been developed to handle the large volumes of data generated by such system.

Highly advanced human-machine interface/process visualization systems exist today that are linked to data sources such as the above-described sensors and controllers. Such systems acquire and digest (e.g., filter) the process data described above. The digested process data in-turn drives a graphical display rendered by a human machine interface. Examples of such systems are the well-known Wonderware INTOUCH® human-machine interface (HMI) software system for visualizing and controlling a wide variety of industrial processes and the ArchestrA™ (e.g., the application server or AppServer for INTOUCH™) comprehensive automation and information software open architecture designed to integrate and extend the life of legacy systems by leveraging the latest, open industry standards and software technologies.

An INTOUCH HMI process visualization application includes a set of graphical views of a particular process. Each view, in turn, comprises one or more graphical elements. The graphical elements are "animated" in the sense that their display state changes over time in response to associated/linked data sources. For example, a view of a refining process potentially includes a tank graphical element. The tank graphical element has a visual indicator showing the level of a liquid contained within the tank, and the level indicator of the graphical element rises and falls in response to a stream of data supplied by a tank level sensor indicative of the liquid level within the tank. Animated graphical images driven by constantly changing process data values within data streams, of which the tank level indicator is only one example, are considerably easier for a human observer to comprehend than a stream of numbers. For this reason process visualization systems, such as INTOUCH, have become components of supervisory process control and manufacturing information systems.

The INTOUCH HMI empowers users to quickly and easily develop custom graphical views of their processes. Users can develop graphics with a variety of tools in WONDERWARE's WindowMaker graphical view editing program, which includes: standard graphical components, displays, animations, bitmap images, ActiveX controls, a graphics library containing thousands of preconfigured industrial images, SmartSymbol technology, tag definitions, I/O configuration, binding, scripts, alarm and history configurations.

Typically, users use INTOUCH to develop supervisory control and data acquisition systems applications and HMI applications. Users use INTOUCH to develop their custom applications to visualize plant data and status in a real-time manner by interfacing HMI software to sources of plant equipment, such as PLCs. To develop INTOUCH applications, users need to define real-time data connectivity to PLC, tag database, graphics development, graphics animation and alarms definition.

HMI applications have been used for supervisory controls, panels and controls. HMI applications are developed using HMI application development utilities that allow users to create a specific configuration (referred to herein as an HMI application) for their own specific need/application. Therefore, HMI development utility software is designed and developed by a software vendor. Thereafter, the HMI development utility is used by end users to render a potentially vast number of HMI applications including views and associated functionality for particularized needs of specific process automation and manufacturing information installations.

While it is important to innovate and provide new technological offerings, it is also important to provide a migration path from existing technologies to the new offerings. HMI technologies and the systems within which they operate are constantly evolving. Typical manufacturing automation HMI application definitions consist of a number of configured elements including: displays, tags, I/O binding, PLC connections, animations, scripts, alarms and events, history configuration. Therefore evolution of HMI technologies presents a potential problem for users that have created a large number of HMI applications using existing technologies.

To encourage users to adopt newer technologies, HMI utility developers have provided migration paths that enable users to leverage their previously created HMI applications in systems that adopt newer platforms. The general approach of such developers is to provide tools that extract and convert the configured information of the existing HMI applications from existing HMI applications into HMI applications that will run on the new technological platforms.

An exemplary environment within which supervisory control and data acquisition (SCADA) and manufacturing execution system (MES) are potentially implemented is described, for example in Krajewski III, et al., U.S. patent application Ser. No. 10/943,301 which corresponds to US App. Pub. 2006/0056285 A1, and Krajewski et al., U.S. patent application Ser. No. 11/549,801 which corresponds to US App. Pub. 2008/0189637 A1, the contents of which are incorporated herein by reference in their entirety, including any references contained therein. The MES is, by way of example, the Wonderware Operations Software (formally known as Factelligence), which provides a scalable and configurable Manufacturing Execution System (MES) designed to help manufacturers across a wide range of industries improve their operational efficiency, manufacturing responsiveness and brand integrity, a product of Invensys, Systems, Inc. The MES differs from the SCADA component in that it is not generally used to exert supervisory control over a plant/manufacturing process. Instead, the IVIES monitors production and records various production/manufacturing events and applies known business rules to render decisions governing production operations carried out by the SCADA system. MES systems interface to higher level enterprise resource planning (ERP) systems.

SUMMARY OF THE INVENTION

In one form, a system manages human machine interface (HMI) applications for industrial control and automation. Software instructions stored on a tangible, non-transitory media and executable by a processor receive data indicative of a manufacturing/process control system being monitored and display a user interface indicative of a status of the manufacturing/process control system being monitored wherein the status is based on the received data. In addition, instructions display graphic elements as part of the user interface. Each graphic element is associated with and indicative of a status of a plurality of alarms of aspects of the manufacturing/process control system being monitored. The alarm status of each graphic element is a function of and based on the status of its associated plurality of alarms.

In another form, software instructions stored on a tangible, non-transitory media are executable by a processor. In another form, a processor executable method is provided.

BRIEF DESCRIPTION OF THE DRAWINGS

FIGS. 3A-3E are illustrations of trend pen visualizations of blended real time and historical data of a process variable in a single trend with minimum configuration over one hour.

FIGS. 4A-4E are illustrations of trend pen visualizations of blended real time and historical data of a process variable in a single trend with minimum configuration over four hours.

DETAILED DESCRIPTION

The following description is based on embodiments of the invention and should not be taken as limiting the invention with regard to alternative embodiments that are not explicitly described herein. By way of example, the present invention is incorporated within a supervisory process control and manufacturing information application development and runtime environment wherein individual data sources (e.g., process equipment and associated logic) are represented by application objects. An example of such system is described in detail in Resnick et al., U.S. patent application Ser. No. 10/179,668 filed on Jun. 24, 2002, which corresponds to US App. Pub. 20020198920, for SUPERVISORY PROCESS CONTROL AND MANUFACTURING INFORMATION SYSTEM APPLICATION HAVING A LAYERED ARCHITECTURE, the contents of which are incorporated herein by reference in their entirety including the contents and teachings of any references identified/contained therein. However, as those skilled in the art will appreciate in view of the disclosed exemplary embodiments, the present invention is potentially applicable to a variety of alternative supervisory process control and manufacturing information application development and runtime environments.

The disclosure herein is directed primarily to an infrastructure and related methods for centrally managing HMI applications (e.g., INTOUCH applications) within a supervisory process control and manufacturing information application environment comprising potentially many networked HMI nodes running separate instances of a previously defined HMI application. The disclosure includes a description of an HMI application encapsulated within a reusable HMI application template. Thereafter, HMI application objects are instantiated from the HMI application template and installed on a designated networked HMI node.

Figure 5:
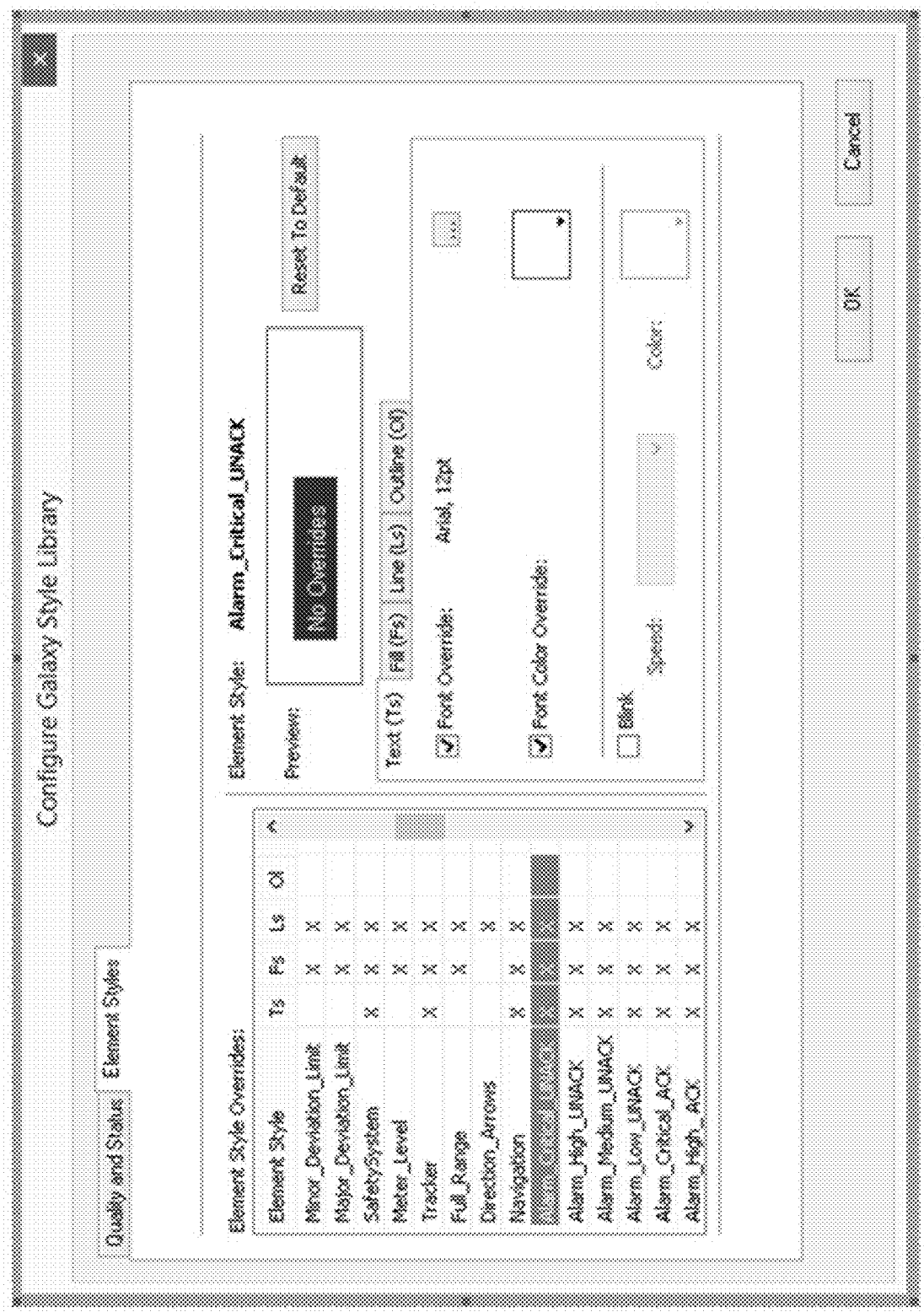
FIG. 5 is a screen shot of an interface for specifying an element style.

A second aspect of centrally managing HMI applications disclosed herein relates to propagating changes to symbols making up a portion of the graphics of an HMI application template into a set of HMI application object templates. By way of example, a symbol template is globally defined outside the HMI application. The symbol graphics are incorporated into HMI application templates via a reference to the centrally managed symbol template. The use of symbol templates to define symbol graphics for HMI applications facilitates propagating changes (using the aforementioned cross-reference lists) to the symbol templates down to all child symbol templates as well as all HMI application templates that incorporate by reference the changed original and derived child symbol templates. Such relationships and propagation paths are described in US App. Pub. 2008/0189637 A1 with reference to FIG. 5, is incorporated herein by reference.

A third aspect of centrally managing HMI applications disclosed herein relates to maintaining and graphically presenting a status for HMI objects in various views (e.g., deployment, derivation, model, etc.) of the contents of the configuration database 124 via the IDE 126. Examples of current status include: checked in/out, deployed/undeployed, and changed. Each of these exemplary statuses enables users to make decisions with regard to distributing instances of an HMI application.

Yet another aspect of the disclosed central management arrangement is the ability of users to edit an existing HMI application definition (template) from a remotely deployed configuration tool such as an Integrated Development Environment (IDE) facility.

Figure 1:
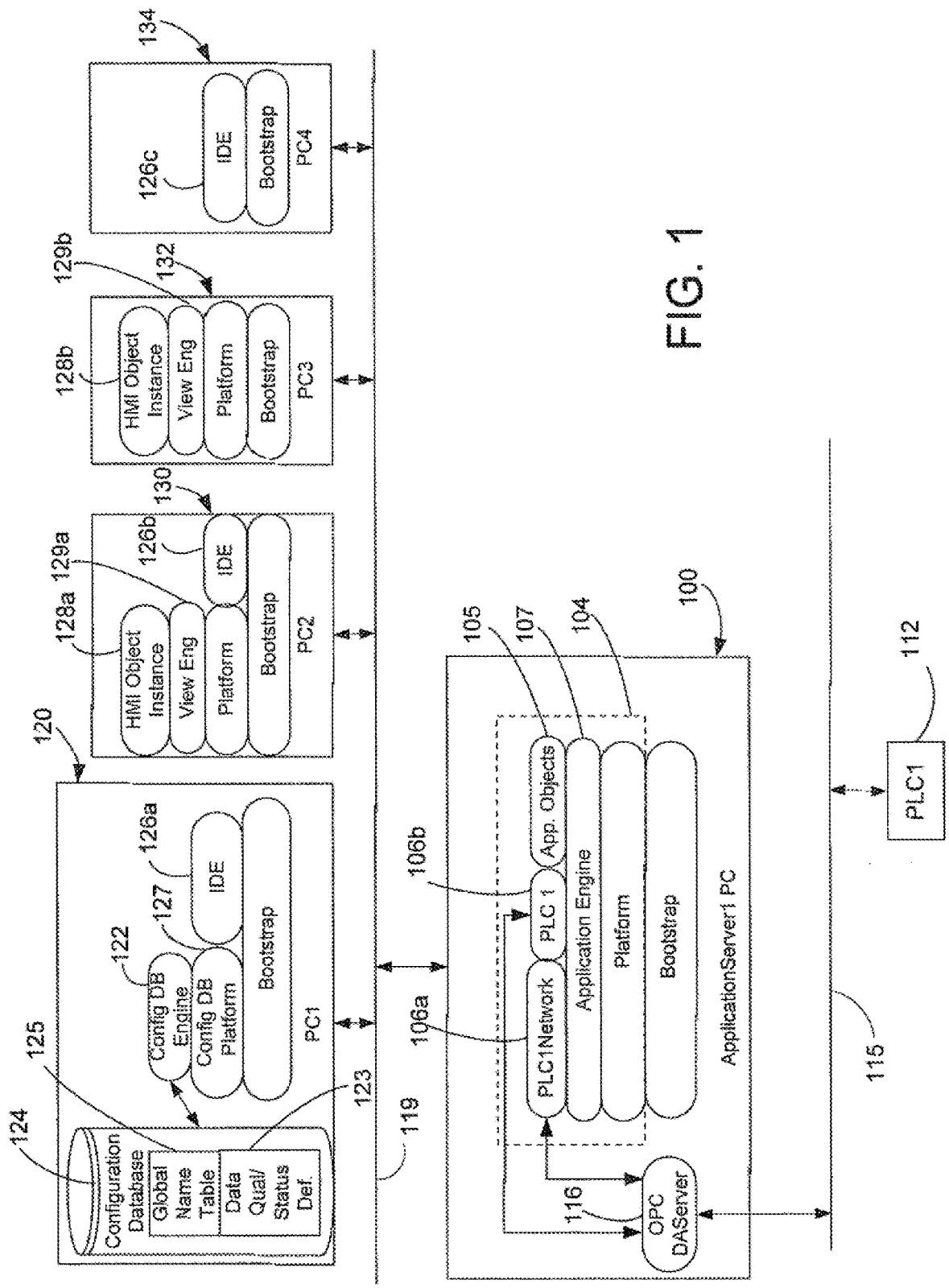
FIG. 1 is a schematic diagram depicting an exemplary supervisory process control network including a multilayered supervisory process control and manufacturing information application including a set of personal computers having view engines and associated human-machine interface (HMI) application objects of an HMI system.

FIG. 1:

Referring to FIG. 1, a schematic diagram depicts hosting/hierarchical relationships of components within an exemplary distributed/networked supervisory process control environment. In the exemplary network, each of the multiple computing hardware nodes (PCs 100, 120, 130, 132, 134) run bootstrap software that operates as the host for subsequently loaded platform objects and a development tool referred to herein as the IDE facility. Thereafter, platform object instances are installed on the PCs. Only one platform object can be installed on each PC. The platform objects host and provide services to subsequently installed engine objects. The engines objects, in turn, potentially operate as hosts to subsequently installed HMI, device integration and application objects. The engine objects are distinguished by their differing services/hosting capabilities—and thus the type of objects they host. For example, view engines host HMI object instances while application engines host device integration objects and application objects. The various types of objects mentioned above are described further herein below.

With continued reference to FIG. 1, multiple PCs 120, 130 and 134 run an integrated design and development tool (IDE 126a-c). The IDE 126 is utilized by developers to configure and deploy components, including application objects, of a supervisory process control and manufacturing information system to designated PC nodes attached to an engineering network 119. The IDE 126 is a utility (comprising potentially multiple components) from which process control and manufacturing information applications, including application objects and engines, are defined, created and deployed to a variety of platforms/engines including, for example, the application server PC 100. Developers of a supervisory process control and manufacturing information application, through the IDE 126, carry out a wide variety of application design functions including: importing new object and template types, configuring new templates from existing templates, defining new application objects, and deploying the application objects to the host application engines (e.g., AppEngine1 on the application server PC 100). The IDE 126 is also where HMI templates, incorporating previously developed HMI applications, are defined and resulting HMI objects are instantiated and deployed to target PCs having a previously installed view engine (e.g., view engines 129a and 129b).

The IDE 126 copies operate upon a set of object templates stored in a configuration database 124 (e.g., Galaxy database) wherein the names of the defined object templates are maintained in a global name table 125. The global name table 125 facilitates binding location independent object names to location-derived handles facilitating routing messages between objects within the system depicted in FIG. 1. The configuration database 124 stores, for a configured application component, object data as well as any code or documents associated with the configured objects. The configuration database 124 stores both base object templates and derived templates for the various objects (e.g., application engines, application objects, view engines and HMI objects) depicted in FIG. 1. An exemplary visualization HMI application object derivation and instance creation scheme described in US App. Pub. 2008/0189637 A1 with reference to FIG. 5, is incorporated herein by reference. In an exemplary embodiment, the configuration database 124 comprises a MICROSOFT SQL server.

The contents of the configuration database 124 are accessed via a configuration database engine 122, also known as a galaxy repository. The configuration database engine 122 supports remote, multi-user access via the IDE 126 copies through graphically presentable check-in/checkout status descriptors for each defined object in the configuration database 124. The configuration database engine 122 also supports deployment of objects and software from a centralized source to other nodes on the system.

In accordance with an illustrative embodiment, a data quality and status behavior definition 123 is stored within the configuration database 124. From this centralized location, a global data distribution mechanism automatically delivers the new version of the definition 123 to all the runtime nodes without further user intervention. The definition 123, specifying animated graphical behaviors in response to data statuses, is shared across the entire set of nodes and HMI applications that fall within the scope of the configuration database 124, and is not specific to any individual node or HMI application.

In the illustrative embodiment, the configuration database engine 122 is hosted by a configuration database platform 127. The configuration database platform 127 is generally the same as the other platforms installed on the PCs in the system. However, the configuration database platform 127 is assigned a unique status (and corresponding name) within the system as the platform associated with the single active configuration database 124. Thus, the disclosed system includes a single, centrally managed configuration database. In alternative embodiments, multiple copies of the contents of the database 124 are maintained (e.g., a read-only or backup copy of the contents of the database 124) on multiple nodes in the system. In the illustrative embodiment, the configuration database platform 127 and the hosted configuration database engine 122 perform the specialized functions of: data/software distribution, maintaining the global name table 125, resolving (using the name table 125) globally unique location-independent reference strings to location-derived handles (for message exchange), administering security/limited access to resources in a multi-user environment, versioning, centralized license management and importing/exporting object templates and instances.

The IDE 126 supports a variety of configuration operations involving the configuration database 124. By way of example, engineers utilize the IDE 126 to import new object templates into the configuration database 124 (via the configuration database engine 122), configure new object templates, and deploy the objects to designated PCs on the engineering network 119. As noted above, multiple copies of the IDE 126 residing on distinct network nodes are capable of accessing and editing the object definitions, including HMI application definitions and symbol definitions that are potentially incorporated into the HMI application definitions (templates).

In the illustrative example, multiple HMI object instances 128*a-b* are deployed on multiple hardware nodes (PCs 130 and 132). The HMI object instances 128*a-b*, described in US App. Pub. 2008/0189637 A1 with reference to FIG. 4 is incorporated herein by reference, provide a graphical view/window representing a current status of a process/plant or portion thereof based upon information obtained via device integration and application objects from devices/controllers residing on a plant floor network 115. A single view engine hosts multiple distinct HMI object instances corresponding to various configured process/plant views driven by information provided by, for example a connected field device or PLC (e.g., PLC 112). In the exemplary embodiment, the HMI object instances 128*a-b* are hosted by view engines 129*a-b* (described in US App. Pub. 2008/0189637 A1 with reference to FIG. 3, incorporated herein by reference) in a multi-layered supervisory process control and manufacturing information system architecture. While only a single HMI object instance is shown for each view engine in FIG. 1, each view engine is capable of simultaneously hosting multiple HMI object instances.

The hosted relationship between HMI object instances 128 and corresponding view engines 129 facilitate access to certain services supported by the view engines 129. By way of example the view engines 129 support updating the hosted HMI object instances 128 independently (automatic change propagation when corresponding templates are updated). Also, the view engines 129 cache (on the associated network node) the displays associated with the HMI object instances 128.

Turning to the application server1 PC 100 on the engineering network 119, in the illustrative embodiment, data sources are presented, by way of example, in the form of application objects 105. The application objects 105 carry out a variety of functions including, representing the status of process equipment and associated application logic. The application objects carry out any of a variety of monitoring/control functions while positioned at an application level of the illustrated distributed hierarchical supervisory process control and manufacturing application architecture. Device integration objects 106*a* and 106*b*, situated at an application level as well in the hierarchy, represent data sources on a plant floor network such as PLCs (PLC1), smart field devices, and associated I/O networks (e.g., PLC1 network).

The application objects and device integration objects communicate with one another both locally (within a single personal computer) and through non-local communications with objects hosted on personal computers attached to the engineering network 119.

The application objects 105 are identified, by way of example, within the global name table 125 maintained by the configuration database 124 (e.g., the WONDERWARE Galaxy Repository)—the contents of which are made available to a developer via, for example the IDE 126*a-c* and HMI object instances 128*a-b* that, by way of example, incorporate INTOUCH applications and their associated displays. Thus, in accordance with an embodiment of the present invention, a dynamic graphical view of a plant/process in the form of an INTOUCH application is initially created using, for example, the WINDOWMAKER utility. The entire INTOUCH application is thereafter incorporated into an HMI object template including necessary components for use in the multi-leveled application execution environment described herein. The resulting HMI object template is stored/maintained/managed in the configuration database 124. Thereafter, subsequent derived versions of the base template are maintained as children, and retain an inheritance relation, with the parent HMI object template. The original and derived templates are available for distribution via the IDE 126 to appropriate nodes on the network 119 containing a previously installed view engine (e.g. view engine 129*a*).

Figure 2:
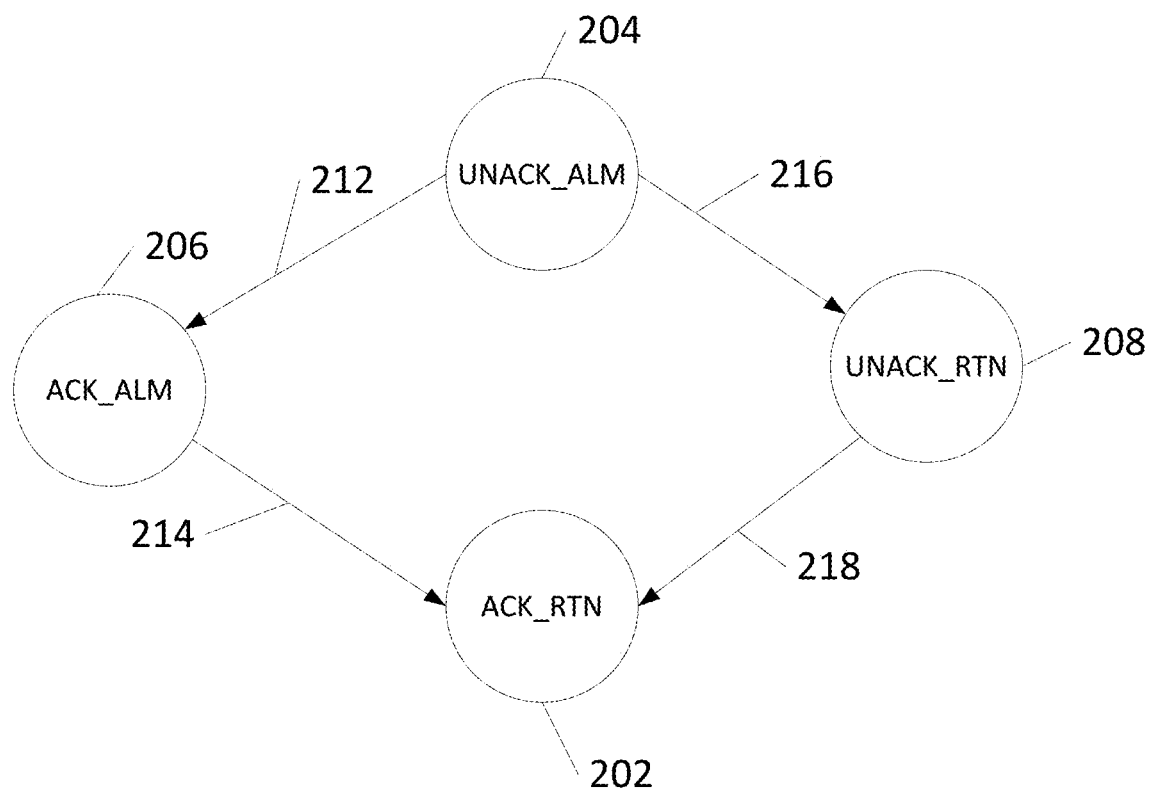
FIG. 2 is a state diagram illustrating various states of border animation of objects and their transitions.

With continued reference to FIG. 1, the application server 1 PC 100 executes a multi-layered supervisory process control and manufacturing information application comprising a first portion 104. The application portion 104 includes the application objects 105 and device integration objects PLC1Network 106*a* and PLC1 106*b*. The PLC1Network 106*a* device integration object facilitates configuring a data access server (e.g., OPC DAServer 116). The PLC1 106*b* device integration object, operating as an OPC client, accesses data locations within the buffers of the OPC DAServer 116. The data access server 116 and the device integration objects cooperatively import and buffer data from external process control components such as PLCs (e.g., PLC1 112) or other field devices (not depicted) on the plant floor network 115. An application engine 107 hosts both the application objects 105 and device integration objects 106*a* and 106*b*. The application engine 107, as a host, manages periodic/event driven execution of the hosted application and device-integration objects. The aforementioned components of the hierarchical hosting arrangement on the PC 100 described in US App. Pub. 2008/0189637 A1 with reference to FIG. 2 is incorporated herein by reference.

In the illustrative example, requests for data are submitted via the data access server 116 to retrieve data from the PLC1 112. The retrieved data is thereafter used by the HMI object instances 128*a* and 128*b* to drive graphical displays representing, for example, the status of plant floor equipment. The data buffer of the data access server 116 is accessed (directly/indirectly) by the variety of application-level objects (e.g., application objects 105, PLC1Network 106*a*, PLC1 106*b*, etc.) executing upon the personal computer 100. Examples of application objects represent data sources and logic including, by way of example, discrete devices, analog devices, field references, events/triggers, production events, etc. In an exemplary embodiment, information obtained/provided by the application-level objects 105, 106*a* and 106*b* is stored in a runtime (Historian) process information database (not shown). The data is thereafter obtained by the HMI object instances 128*a*-*b* to drive a display state of animated process graphics.

The data access server 116 is, by way of example, an OPC Server. However, those skilled in the art will readily appreciate the wide variety of custom and standardized data formats/protocols that are potentially carried out by the data access server 116. Furthermore, the exemplary application-level device integration objects 106*a* and 106*b*, through connections to the data access server 116, represent a PLC network and the operation of the PLC itself. However, the application-level objects (e.g., device integration and application objects) hosted by the application engine 107 comprise a virtually limitless spectrum of classes of executable objects that perform desired supervisory control and data acquisition/integration functions in the context of the supervisory process control and manufacturing information application.

The supervisory process control and manufacturing information system is potentially integrated with a variety of processes/plant information sources via a variety of communication channels. The exemplary system including the multi-layered application comprising portion 104 is communicatively coupled to the PLC1 112. The PLC 1, in turn, receives plant equipment status information via the plant floor network 115. In a particular embodiment, the PLC 112 comprises a node on an Ethernet LAN to which the PC 100 is connected. In other embodiments, the PLC 112 is linked directly to physical communication ports on the PC 100. In still other alternative embodiments the PC 100 receives data from field I/O modules that receive, for example, analog data from field devices that operate in a distributed regulatory control system.

Thus, as illustrated in FIG. 1, a system for managing human machine interface (HMI) applications for industrial control and automation is provided The system comprises a processor such as PC 100 in combination with software instructions stored on a tangible, non-transitory media and executable by the processor. The instructions comprise instructions for receiving data indicative of a manufacturing/process control system being monitored (e.g., data stored in database 124) and instructions for displaying a user interface indicative of a status of the manufacturing/process control system being monitored (e.g., application objects 105) wherein the status is based on the received data.

It is noted that the system depicted in FIG. 1 and described hereinabove is merely an example of a system including a multi-layered hierarchical architecture for a supervisory process control and manufacturing information system. It is further noted that FIG. 1 is presented as a logical view of the hosting and/or containment interrelations between installed components including software and physical computing hardware. The system disclosed herein is suitable for virtually any network topology. For example, the present invention is applicable to a system wherein both configuration utility and supervisory process control visualization applications run on a single computer system linked to a controlled process.

Alarms and Events

An alarm is an event that has a state and requires operator intervention. It requires an acknowledgement. Alarms are detected by software components and reported using alarm distribution mechanisms to be discussed later. Every alarm is reported, or sent, using a data structure that contains data fields that define the information for the alarms. The following list contains fields sent with an alarm notification. The alarm primitive which generates this message needs to support generation of these fields, but may also have other attributes. Fields that are historized to event history are marked "Historized".

TagName—tag generating alarm, e.g. "TIC101" (Historized)

Name—name of alarm, e.g., "PV.HiAlarm" (Historized)

InAlarm—indication of whether the condition is currently active or inactive. (Boolean). (Historized)

Quality—current data quality of the data upon which the alarm is based. (MxQuality) (Historized)

OnTimeStamp—the time the condition went into alarm. (Time) (Historized . . . when goes into alarm):

Alarm On timestamp [AppServer Callisto] this should be the timestamp of the associated attribute, if available; otherwise, it should be the AppEngine scan time OffTimeStamp—the time the condition returned to normal. (Time) (Historized . . . when goes out of alarm):

Alarm Off timestamp [AppServer Callisto] this should be the timestamp of the associated attribute, if available; otherwise, it should be the AppEngine scan time. If an active alarm is disabled (which forces a return to normal), the timestamp should be the Current time Category—the alarm/event category, values from 1-14 set by Wonderware. These values are to be associated with Internationalized Category labels set by Wonderware as follows. (Historized)

TABLE 1

CATEGORIES

| Category Ordinal | Category Label (English) | Meaning (only documented, not in system) |
|---|---|---|
| 1 | Discrete | A discrete value event or alarm, such as a change of state. |
| 2 | Value LoLo | A continuous value is significantly below acceptable range. |
| 3 | Value Lo | A continuous value is below or approaching below acceptable range. |
| 4 | Value Hi | A continuous value is above or approaching above acceptable range. |
| 5 | Value HiHi | A continuous value is significantly above acceptable range. |
| 6 | Deviation Minor | A value has a minor deviation (+/−) from target or setpoint. |
| 7 | Deviation Major | A value has a major deviation (+/−) from target or setpoint. |
| 8 | ROC Lo | A value's rate of change is slower than acceptable. |
| 9 | ROC Hi | A value's rate of change is faster than acceptable. |
| 10 | SPC | A value deviates from the SPC target/range. |
| 11 | Process | An alarm or event associated with the physical process/plant has occurred. |
| 12 | System | An alarm or event associated with the automation system has occurred. |
| 13 | Batch | An alarm or event associated with a batch process has occurred. |
| 14 | Software | An alarm or event associated with a software operation/logic (such as divide by zero in script) has occurred. |

Referring to TABLE 1, above, the category labels are retrieved from a dictionary file by the UI clients and by the INTOUCH alarm provider, since it requires these strings. These strings can be localized to other languages. The INTOUCH provider is to use the default galaxy language to retrieve these strings and send them to INTOUCH. Thus, they will only appear in INTOUCH and INTOUCH history as the default galaxy language strings. The future view engine will use the locale of the client, meaning only the category ordinal is to be historized. (Historized).

Priority—an integer value from 0-999 indicating the urgency of the alarm. By default, Zero is most urgent, 999 is least urgent (as in INTOUCH). This is the opposite of OPC. Since INTOUCH does not support 0, 0 is converted to 1 prior to sending to INTOUCH provider API. In the ArchestrA Apollo Project this is a configurable option with mapping of priority ranges to severity levels. (Historized)

TargetValueReference—(optional field)—reference to target value for the condition (MxReference). (not Historized)

ActualValueReference—(optional field)—reference to the actual value for the condition (MxReference). (not Historized)

TargetValue Snapshot—(optional field)—target value for the condition at time of alarm. (Historized)

ActualValueSnapshot—(optional field)—actual value for the condition at time of alarm (Historized)

EngUnitsReference—(optional field)—reference to the engineering units string for the condition (MxReference). (Historized)

AcknowledgedFlag—indicates whether alarm has been acknowledged yet. If this flag is false, the alarm is waiting for an acknowledgment. (Boolean) (Historized as event)

AcknowledgeTime—indicates time alarm was acknowledged if AcknowledgedFlag is true. (Time) (Historized . . . when gets acknowledged)

AcknowledgeUserId—String containing name of user who acknowledged alarm, if currently active and acknowledged. (Historized . . . when gets acknowledged)

AlarmMode—indicates whether alarm is Enabled, Silenced or Disabled. (enum). (Historized . . . when changes state).

Message—Message text describing the alarm. Can be either statically configured or dynamically constructed. Typically contains alarm description, possibly the limit value exceeded, and possibly the variable value. For the standard alarm utility primitive, this message is retrieved via a reference to a string/international string attribute in the object. The reference is setup at Object-Designer time for standard alarm primitives. If none is specified, then the common primitive short description attribute is utilized. This field is also provided in the alarm extension primitive and can be dynamically generated and scripted. The alarm extension primitive is in Slice 07. (Historized)

Area—area for the object (Historized)

On a global (per galaxy) basis, the user of the IDE (Integrated Development Environment of Archestra) can edit the galaxy object to configure the mapping of alarm priority to severity and its associated settings.

Figure 18:
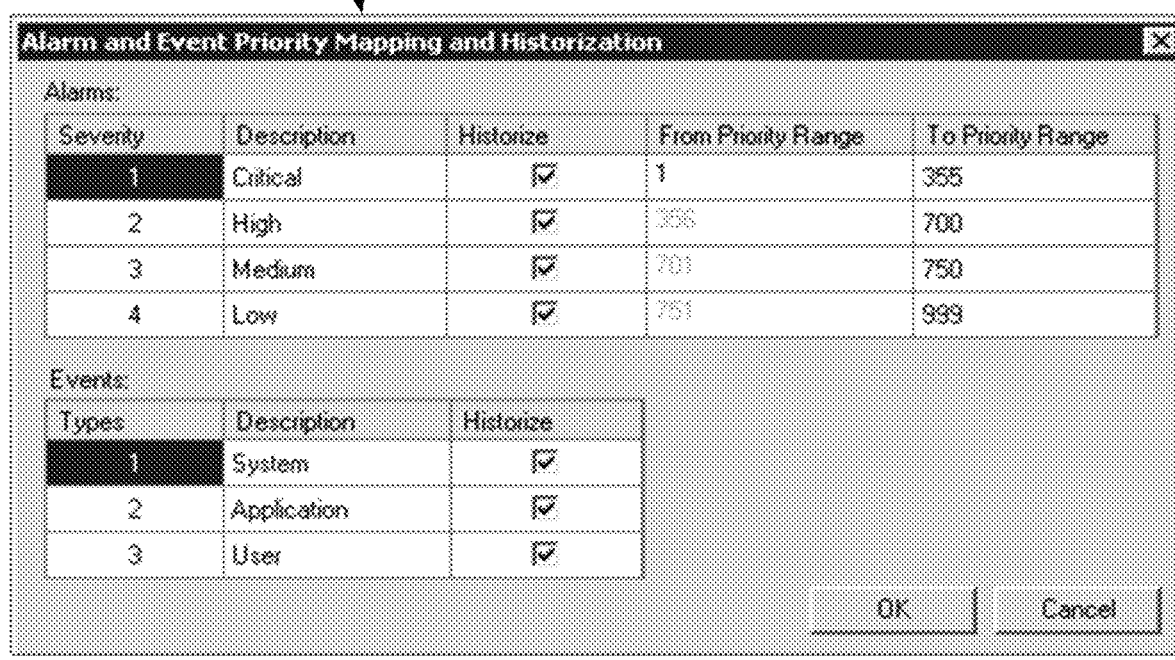
FIG. 18 illustrates one example of a screen shot for configuring alarm and priority mapping.
Figure 19:
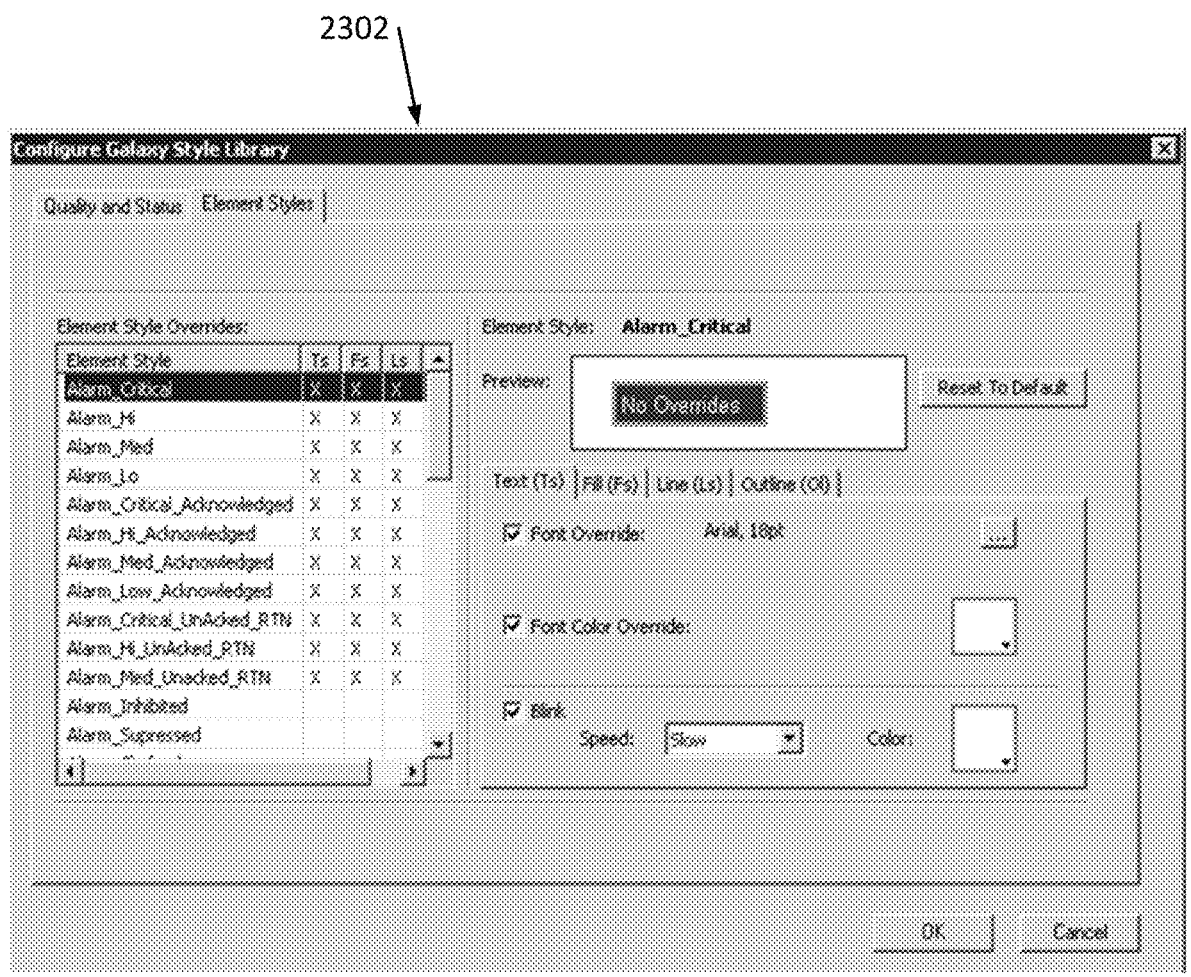
FIG. 19 illustrates one example of a screen shot for configuring alarm element styles mapped for severity, mode, acknowledged state.

FIG. 18 illustrates one example of a screen shot 2202 of a user interface for configuring alarm and priority mapping. Settings for the priority to severity mapping as shown in FIG. 18 are as follows: Description, Historize, From Priority Range, and To Priority Range, settings for each Severity. (Note: Severity 1 must start at 1. Severity 4 must end at 999.) FIG. 19 illustrates one example of a screen shot 2302 of a user interface for configuring alarm element styles mapped for severity, mode, acknowledged state.

Thus, the user is given the actual flexibility in changing what these bands actually mean. So, a particular project might define these Severities to be reversed from the defaults provided by Wonderware if they were interested in OPC compatibility more than INTOUCH compatibility. The Alarm Summary Display is configurable to sort from 1 to 999 or from 999-1 on Priority. By default, it shows priority 1 alarms at top and 999 alarms at bottom (the INTOUCH default). For example, all non-bold items in TABLE 2 below can be edited in the Galaxy object.

TABLE 2

Default Alarm Priority Severities in Galaxy Object

| Severity | Description | Historize | From Priority Range | To Priority Range |
|---|---|---|---|---|
| 1 | Critical | Y | 1 | 250 |
| 2 | High | Y | 251 | 500 |
| 3 | Medium | Y | 501 | 750 |
| 4 | Low | Y | 751 | 999 |

In addition, Events can be configured into groupings as shown in TABLE 3 below:

TABLE 3

Default Event Priorities in Galaxy Object

| Types | Description | Historize |
|---|---|---|
| 1 | System | Y |
| 2 | Application | Y |
| 3 | User | N |

Retrieval of Priority Mapping for use by AppServer components:
The mapping information is stored in a file named Data5.txt in the Global Data Cache and is automatically distributed from the GR to all platforms in the Galaxy.
On each platform, this information is retrieved by the Alarms & Events subsystem and is made available to all Alarms & Events components that need to deal with Severity.
The mapping information is retrieved at start-up. It is also retrieved at runtime whenever the file Data5.txt is updated. Runtime updates are accomplished via the Global Data Cache subscription mechanism so the file is re-read ONLY when it is updated.
A simple call to a singleton component's method GetSeverityForPriority( ) is all that is necessary for retrieving the Severity for a corresponding Priority, for any AppServer component on an Engine.
If this function returns zero, it means a corresponding Severity could not be found for the indicated Priority. In this case, it is up to the caller to declare an error situation or substitute a meaningful default value.
Note: In a multi-Galaxy environment in which Galaxies are not sharing Global Data Cache information, it is possible that one Galaxy may have a different Priority to Severity mapping than another. For example, if Galaxy1 has alarms with Priorities 1-300 mapped to Severity 1 and Galaxy2 has alarms with Priority 1-200 mapped to Severity 1, then an alarm with Priority 250 will be mapped to Severity 1 on Galaxy1 and Severity 2 on Galaxy2.
The ITAlarmProvider reports Severity to the INTOUCH Distributed Alarm System (AlarmMgr) in the User1 data field. This field can be displayed on all INTOUCH alarm displays and on the ArchestrA Alarm Client (EAC). The display client can be configured to label the column header as "Severity".
To ensure that Alarmed attributes will always have current data, the alarm primitive and the alarm extension primitive register a reference to the alarmed attribute. This will guarantee that message exchange will never suspend updates for this attribute. Even if alarms are disabled for a particular attribute, the Scan On Demand feature will not be functional (i.e. the attribute cannot be Suspended).
This section describes the system components that detect an alarm or event and also report that alarm or event. Alarms and events can be detected by software components in the system. Events can be reported by a larger variety of components than alarms. Events can be detected by virtually any component in the system, including AutomationObjects, SMC, etc. Events are thus more general purpose than alarms and provide a means for any software component to indicate a condition or occurrence of interest to the event system. For example, the SMC can report a user log-in message as an event (>R0.5). Several types of events can be reported as described earlier. When any component reports an event, it uses an event API to do so. The component implementing the event API reports its event messages to Alarm/Event distributors and History, described later in this document. Events are sent to INTOUCH for real-time display and for historization.

Alarms can only be detected by AutomationObjects. Any AutomationObject (including Platforms, Engines) can detect and generate an alarm. To detect an alarm, the AutomationObject must provide detection logic and set a Boolean Attribute flag to indicate whether the alarm is currently active or inactive.

If the alarm is associated with an attribute that supports buffered data, the AutomationObject's detection logic must set the Buffer property of the Boolean condition Attribute with a VTQ array (V being a Boolean representing whether or not the condition is true or false). There should be one VTQ for every VTQ in the base attribute's buffer, so that when the alarm messages are composed, PV can be extracted from the base attribute's buffer. Times for the corresponding elements in the base attribute's buffer and resulting Boolean condition attribute's buffer should match. Sequence of alarm state changes can be generated as a result of processing the condition buffer. A set of alarm messages corresponding to the alarm state changes will be composed and sent to the Notification Distributor.

The user can only acknowledge the current alarm. Alarm monitoring buffered attribute can be enabled/silenced/disabled/inhibited. To report an alarm, the AutomationObject must contain an Alarm Primitive. The Alarm Primitive examines the Boolean condition to determine whether the alarm is active. An Alarm Primitive is dedicated to reporting a single alarm condition's state. Alarm Primitives report their alarm messages to Alarm/Event distributors, described later in this document.

This section describes the impact of data quality on alarm reporting. Alarms are only reported when the data quality of the (true) Boolean condition flag is either Good or Uncertain.

Alarms are only cleared when the data quality of the (false) Boolean condition flag is either Good or Uncertain.

If the condition flag is Bad or Initializing quality, the state of the condition flag is ignored and no new alarm reports or alarm clears occur. As an example, assume the following occurs during normal execution of an object:
An alarm condition is true with good quality (an alarm exists).
The quality of the alarm condition goes bad. (the alarm is not cleared . . . it still exists as in alarm).
The quality of the alarm condition goes Good (no action taken, since the alarm already exists).
The quality of the condition flag does not impact alarm acknowledgment handling at all. In other words, an alarm can be acknowledged even if the condition flag for the alarm has bad quality.
The quality of the condition flag does not impact alarm enable/disable/silence behavior at all.
Some Objects and ArchestrA Graphics symbols—such as those in the Situational Awareness Library (SAL)—need an efficient and simple way to identify whether any alarms on an Object currently need attention, what is the overall status of the most important of those alarms, and how many alarms are presently active overall at each level of severity. In addition, they need Alarm Aggregation (described below) to summarize all contained Objects, following the Model View—so that the alarm information represents the Object and all levels below it. This makes it possible for a user to "drill down" from one level to the next and use aggregation to search for the underlying cause of a complex Object's alarms.

For an Object, aggregation represents the alarms on the Object, on all contained Objects, and on their descendants, down to the lowest levels of the Model View.

For an Area or pseudo-Area, aggregation represents the alarms on the Area Object itself, on all Objects assigned to the Area, and on all sub-Areas and their assigned Objects, down to the lowest levels of the Model View.

For an Attribute, aggregation represents all the alarms on the Attribute itself. This is the lowest level of aggregation.

Alarm Border Animation

Figure 6:
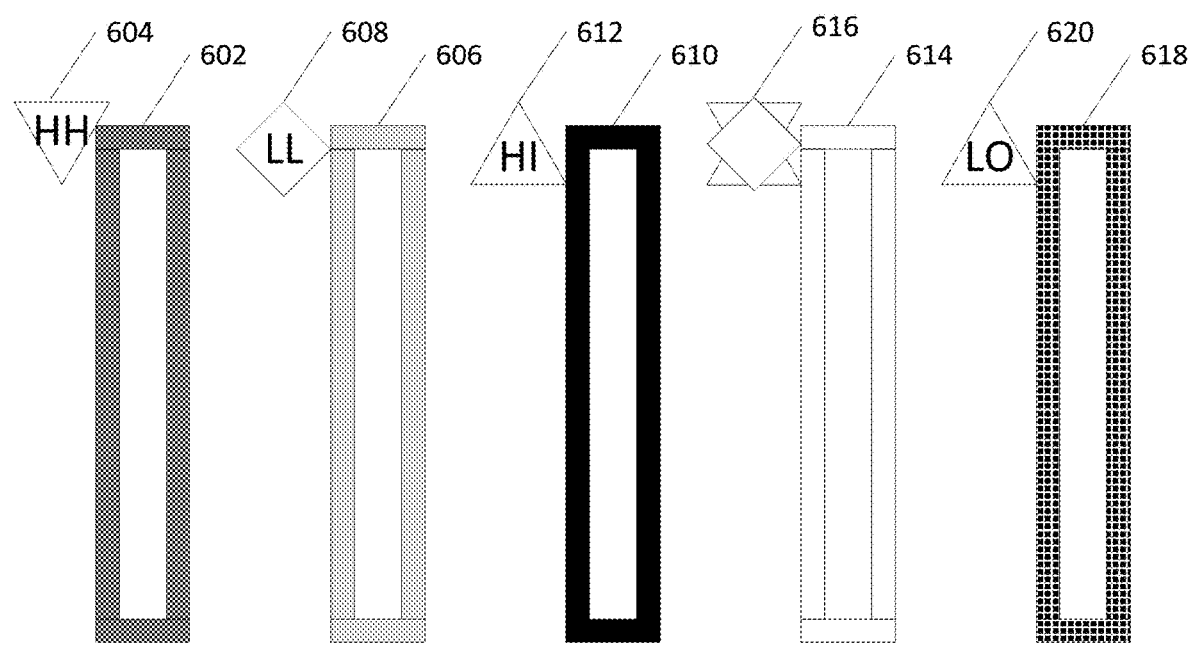
FIG. 6 is a screen shot of an interface for specifying border animation illustrating examples of alarm borders and indications.

As illustrated in FIGS. 1, 2, and 6, and as illustrated in the alarm border animation support (FIGS. 18-19), a system of the invention manages human machine interface (HMI) applications for industrial control and automation. Software instructions stored on a tangible, non-transitory media and executable by a processor receive data indicative of a manufacturing/process control system being monitored and display a user interface indicative of a status of the manufacturing/process control system being monitored wherein the status is based on the received data. In addition, the instructions display graphic elements as part of the user interface. Each element is associated with and indicative of an alarm status of one or more aspects of the manufacturing/process control system being monitored. The alarm status of each graphic element is a function of the status of its associated plurality of alarms. The instructions are also responsive to user input for configuring a selected graphic element with a border. The border is selectively animated in response to the alarm status associated with the selected graphic element being in an alert condition. The animation indicates that the one or more aspects of the manufacturing/process control system associated with the selected graphic element is not at an acceptable value. The software instructions stored on a tangible, non-transitory media are executable by a processor. A processor executable method is provided.

Alarm border animation comprises processor executable software instructions stored on a tangible, non-transitory media (e.g., a memory device) and executed by a processor/server by which a user can easily and quickly configure any graphic element (e.g., object) or group of elements to automatically visualize the alarming state of an entity within their platform application space. The user is provided with a user-selectable border from a border library for a graphic object or group of elements such as illustrated in FIG. 6, which automatically conforms to surround any object's shape, configures itself to the connections surrounding the object, and responds to the object's alarm information. A graphic element in the system can be configured with this border, which is capable of changing state (e.g., animating by blinking or flashing) when certain conditions are met, such as when any object within the border has an alarm.

FIG. 6 is a screen shot of an interface for specifying border animation illustrating examples of alarm borders and indications. Reference character 602 illustrates a blinking dark gray border having a very high (HH) indication 604. Reference character 606 illustrates a blinking light gray border having a very low (LL) indication 608. Reference character 610 illustrates a black border having a high (HI) indication 612. Reference character 614 illustrates a blinking white (or transparent) border having multiple indications 616 superimposed on each other. Reference character 618 illustrates a patterned border having a low (LO) indication 620.

In the past, if a user wanted to put a border around something that would flash red, there were a series of things the user needed to do. It took a while to craft that graphic element and then hook it up to the right thing. The alarm border animation software instructions create a "native animation" that can be attached to all the graphic objects. Using this native animation, the alarm border animation software instructions can make the border of any graphic object blink based on certain stuff. For instance, if the object has the most severe alarm, the border of it will blink red. The border itself will conform to any irregular shape that it has taken on. Also, based on the invention, an object can have a blinking border when any object within it has a high severity alarm. Thus, the processor executes instructions for specifying a user-defined level of hierarchy for the plurality of alarms of each element, instructions for specifying a user-defined hierarchy level for each element above which an alarm is considered severe, instructions for exposing a severe alarm above the user-defined hierarchy level, and instructions for exposing a severe alarm of a particular element when any sub-element within the particular element has a severe alarm.

The border will be automatically drawn around whatever shape the user connects it to. It is not a separate element that the user has to draw. It is a new facet of every graphic element in the system automatically. The most powerful part is that it automatically configures the connection and automatically consumes alarm aggregation data from the application server providing the data from the manufacturing/process control system being monitored by the MES.

One reason this is so important, is because of the time savings to our users and the reduction of error rate in configuration of a system.

In the Wonderware Application Server, the user's application is divided up into software entities called Objects.

Objects exist in a hierarchy where Objects can contain other Objects.

Each Object can have zero or more alarms configured on it, each with a different level of severity.

Alarm Aggregation provides a summary of the alarms at each level in the hierarchy tree to help the user quickly identify which Object has the most urgent alarms in the overall system, and even in which specific part of the Object.

This enables the user to prioritize which alarms to address first, and to quickly locate where the corrections need to be made.

This new animation is introduced in ArchestrA and INTOUCH graphics that allows user to visualize the state of the alarm. The user is able to configure the alarm border animation on any graphic element. The animation can point to the alarm aggregated attributes and it will render the border and indicator base on the alarm states. Thus, the processor executes instructions responsive to a user for configuring the animation of an element to point to an aggregated alarm attribute.

Objects, Areas, and Alarms:

In the Wonderware Application Server (also known as "AppServer") the user's application is divided up into software entities called Objects. Objects can be arranged in a hierarchy where (1) some Objects can contain other Objects, (2) Objects can be grouped into Areas, each of which contains many Objects, and (3) an Area can also contain sub-Areas.

Each Object can have zero or more alarms configured on it, each with a different level of severity.

Areas are a special kind of Object that can contain multiple Objects and other Areas. One of the purposes for an Area is to collect and cache all the information about the current alarms for all the Objects and sub-Areas that it contains.

Application Objects (also known as AppObjects) are a specific kind of Object that can contain data in the form of Field Attributes. Field Attributes have a number of different behaviors that can be configured. An individual Analog Field Attribute can have several different alarms configured on it, each with a different level of severity. So even within a single AppObject, there might be multiple Field Attributes, each with its own most urgent alarm.

The collection of AppObjects and Areas form a hierarchy tree, which is called the "Model View." Each AppObject has one "parent." This parent may an Area, or it may be another AppObject. But every AppObject must have a parent. An Area, however, can only be the child of another Area, or it may have no parent at all.

Alarm States

Each individual alarm is handled by an Alarm Primitive. An alarm has multiple states and the processor executes instructions for selectively rendering a particular style of border or a particular type of animation for each state of an alarm.

The Alarm Primitive monitors a Boolean condition Attribute, and when that attribute changes state the Alarm Primitive reports the alarm has become active (InAlarm) or has returned to normal.

The Alarm Primitive also has a state. When an alarm occurs, two things must take place for the alarm to be considered fully addressed: (1) it must be acknowledged by an operator, (2) it must be returned to normal (usually by fixing the problem). These can happen in either order, but BOTH must take place for the alarm to return to its "resting" state.

The Alarm Primitive also has a mode of operation. In the Enabled mode, the alarm is fully functional. In the Silenced mode, changes to the alarm state are recorded in the alarm history database, but they are NOT annunciated or displayed on the operators' display screens. In the Disabled mode, the alarm is always held in the "Off" state, regardless of the status of the Boolean condition attribute.

Each Alarm Primitive has two important flags:

InAlarm: TRUE when alarm is in the active "in alarm" state

Acked: TRUE when the alarm has been acknowledged

The conditions of these flags define the four basic STATES for an alarm, as seen in TABLE 4 below:

TABLE 4

States of an Alarm

|  | InAlarm = FALSE | InAlarm = TRUE |
|---|---|---|
| Acked = FALSE | UNACK_RTN | UNACK_ALM |
| Acked = TRUE | ACK_RTN | ACK_ALM |

ACK_RTN 202: This is the "ground state" for alarms. Not in alarm, not waiting for an acknowledgment. It is NOT displayed on the Summary List (Current Alarms).

UNACK_ALM 204: This is the state the alarm border animation software instructions goes to when an alarm is first raised. It is active and waiting for an ACK. It shows up on the Summary List (Current Alarms).

ACK_ALM 206: If the alarm is ACKed (acknowledged) but has not yet returned to normal, it still shows up on the Summary List (Current Alarms).

UNACK_RTN 208: If the alarm returns to normal without being ACKed, it still shows up on the Summary List (Current Alarms).

These states are shown in INTOUCH in the alarm displays (ActiveX Alarm Viewer, Alarm DB Viewer, and ArchestrA Embedded Alarm Client). The "Current Alarms" display shows only UNACK_ALM, ACK_ALM, and UNACK_RTN. These are the alarm states that need attention. They need somebody to DO something: either fix the problem, acknowledge the alarm, or both.

Drawn as a state diagram, these states and transitions are illustrated in FIG. 2. When an alarm becomes active from normal, the system transitions from state 202 to state 204 as illustrated by arrow 210. At state 204, if the operator acknowledges the alarm, the system transitions to state 206 as illustrated by arrow 212. At state 206, the system transitions to state 202 as illustrated by arrow 214 when the alarm returns to normal. At state 204, if the alarm returns to normal before being acknowledged, the system transitions to state 208 as illustrated by arrow 216. At state 208, the system transitions to state 202 as illustrated by arrow 218 after the operator acknowledges the alarm.

Each Alarm can be ENABLED, SILENCED, or DISABLED. The meanings are as follows:

Enabled: Alarm is fully functional. When the condition becomes TRUE the alarm state becomes active and everybody can see it on the INTOUCH display screen.

Silenced: Alarm is fully functional. When the condition becomes TRUE the alarm state becomes active. However, it does not get displayed on the screen. It is recorded in the Alarm Database. (In other words, this is a Historization-only setting.)

Disabled: Alarm is forced OFF. Even when the condition becomes TRUE, the alarm state remains FORCED to the ACK_RTN state. It is never waiting for an acknowledgement.

The Enable/Silence/Disable setting can be done at the Area level, Object level, and individual Alarm level.

In summary, to monitor the alarm state(s) of a graphic element, a user can configure an alarm border animation on the graphic element. The user can configure the animation to point to any aggregated alarm attributes. The animation will render the border around the graphic element. A different style of border can be rendered for each state of the alarm. These styles are defined in the Galaxy Style Library. Instructions executed by a processor of the system display graphic elements as part of the user interface so that each element is associated with and indicative of an alarm status of one or more aspects of the manufacturing/process control system being monitored. Instructions executed by a processor of the system are responsive to user input for configuring a selected graphic element with a border which is selectively animated in response to the alarm status associated with the selected graphic element being in an alert condition indicating that the one or more aspects of the manufacturing/process control system associated with the selected graphic element is not at an acceptable value. In various embodiments, these instructions may be part of a system, and/or may be part of software instructions stored on a tangible, non-transitory media and executable by a processor, and/or may be a processor executable method.

The aspects of this feature are at least two-fold: The first is the way in which the system eliminates the need for tedious and error-prone, repetitive data entry tasks which normally need to be done by the user in order to realize this same level of functionality. And secondly, without any additional input from the user the alarm border will draw itself around the element to which it is applied, regardless of the shape/size of the element.

FIG. 6 is a screen shot of an interface for specifying border animation illustrating examples of alarm borders and indications. An alarm border animation user interface is illustrated in the alarm border animation support (FIGS. 6, 18-19).

Besides rendering the border, the alarm border animation is also rendered an indicator on the left corner of the graphic element if user enables this functionality when configuring the animation. The default image of the indicators can be changed launching the Alarm Priority Mapping configuration dialog. When changing the indicators in the galaxy it will be propagated to runtime nodes without having to redeploy the application. The indicators may be indicative of a parameter associated with an alarm, such as a hierarchy or level. Thus, the processor executes instructions for selectively rendering in response to a user selection an indicator on or adjacent the graphic element wherein the indicator is indicative of a parameter associated with the alarm.

Alarm Aggregation

Figure 7:
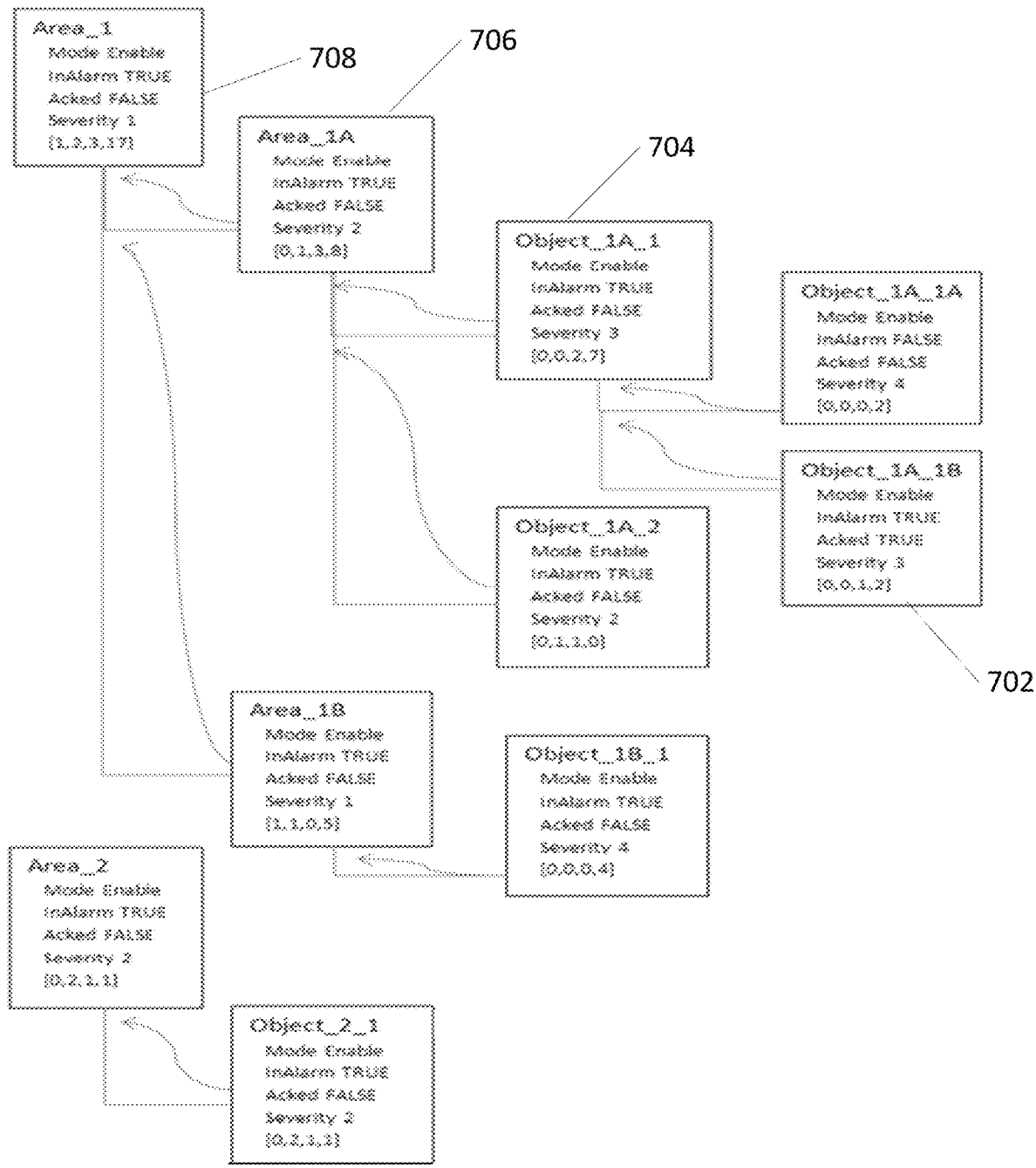
FIG. 7 illustrates bubble up of Alarm Aggregation Objects.

As illustrated in FIGS. 1 and 7, a system manages human machine interface (HMI) applications for industrial control and automation. Software instructions stored on a tangible, non-transitory media and executable by a processor receive data indicative of a manufacturing/process control system being monitored and display a user interface indicative of a status of the manufacturing/process control system being monitored wherein the status is based on the received data. In addition, instructions display graphic elements as part of the user interface. Each graphic element is associated with and indicative of a status of a plurality of alarms of aspects of the manufacturing/process control system being monitored. The alarm status of each graphic element is a function of and based on the status of its associated plurality of alarms. In various embodiments, these instructions may be part of a system, and/or may be part of software instructions stored on a tangible, non-transitory media and executable by a processor, and/or may be a processor executable method.

Alarm aggregation collects and exposes, via standard attribute interface, a summary of the aggregate alarming states of an element in the physical equipment hierarchy, including that of all elements below it in the hierarchy. Alarm aggregation comprises processor executable software instructions stored on a tangible, non-transitory media (e.g., a memory device) and executed by a processor/server providing for a graphical object representing physical equipment organized within a hierarchy. The system collects and organizes alarms in a hierarchy. It exposes a severe alarm above a user-defined level of hierarchy after the aggregated alarming state of the object is determined. This determination involves all sub-objects below that object in the hierarchy reporting their alarm state severity (which is determined in part by whether the alarm has been suppressed) "from the bottom up," instead of analyzing the entire hierarchy "from the top down" as was done in the prior art. Thus, the element may be an object and the processor executes instructions for determining sub-objects below the object in the hierarchy reporting their alarm state severity from the bottom up instead of analyzing the entire hierarchy from the top down.

Sorting Precedence for Alarm Aggregation:

For Alarm Aggregation, identification of the "most urgent" alarm(s) uses the following sorting precedence:

AlarmMode: Enabled precedes Silenced
  InAlarm: TRUE precedes FALSE
    Acked: FALSE precedes TRUE
      Severity Level: 1 is most important, 4 is least important
The alarm border animation software instructions only aggregate alarms in the UNACK_ALM, ACK_ALM, and UNACK_RTN states. (ACK_RTN alarms do not need attention.)

An alarm that is Disabled cannot go into the InAlarm state, so there is nothing to aggregate.

For example, given the following three alarms, the order of urgency is as follows: UNACK_ALM with Severity 3>ACK_ALM with Severity 2>UNACK_RTN with Severity 1.

The "most urgent" alarm on an Object is the one at the top of the sorting order as described above. If two or more alarms on an Object have the same "most-urgent" combination of AlarmMode, InAlarm status, Acked status, and Severity, they have the same ranking for Alarm Aggregation.

In the Wonderware Application Server, the user's application is divided up into software entities called Objects.

Objects exist in a hierarchy where Objects can contain other Objects.

Each Object can have zero or more alarms configured on it, each with a different level of severity.

Alarm Aggregation provides a summary of the alarms at each level in the hierarchy tree to help the user quickly identify which Object has the most urgent alarms in the overall system, and even in which specific part of the Object.

This enables the user to prioritize which alarms to address first, and to quickly locate where the corrections need to be made.

A new animation is introduced in the ArchestrA graphic that allows user to visualize the state of the alarm. User is able to configure the alarm border animation on any graphic element. The animation can point to the alarm aggregated attributes and it will render the border and indicator base on the alarm states.

Aggregation of Alarms for an Object:

To support alarm aggregation on Objects, each Object has a set of Attributes that summarize the overall status of all alarms on the Object and its descendants. These are as follows:

InAlarm—Flag indicating whether any alarms on the individual Object are currently in the InAlarm state. [Data type: MxBoolean]

AlarmMostUrgentSeverity—Severity 1-4 of the "most urgent" alarm(s) on this Object and its descendants. If no alarms are in the InAlarm state or waiting to be Acked, the value is 0. [Data type MxInteger]

AlarmMostUrgentMode—AlarmMode of the "most urgent" alarm(s) on this Object and its descendants. If no alarms are in the InAlarm state or waiting to be Acked, the value is the same as the AlarmMode for this Object. [Data type: MxCustomEnum of type_AlarmModeEnum]

AlarmMostUrgentInAlarm—Flag indicating whether the alarm is presently in the alarm state, for the "most urgent" alarm(s) on this Object and its descendants. If no alarms are in the InAlarm state or waiting to be Acked, the value is FALSE. [Data type: MxBoolean]

AlarmMostUrgentAcked—Flag indicating whether the alarm has been acknowledged for the "most urgent" alarm(s) on this Object and its descendants. If no alarms are in the InAlarm state or waiting to be Acked, the value is TRUE. (That is, no acknowledgment is needed.) [Data type: MxBoolean]

AlarmCntsBySeverity—Array of counts of all alarms that are InAlarm or waiting to be Acked on the Object and its descendants, separated by Severity. Element 1 contains the count of alarms of Severity 1, element 2 contains the count of alarms of Severity 2, and so on. Note these are counts of all alarms in the UNACK_ALM, ACK_ALM, and UNACK_RTN states. [Data type: MxInteger array dimension 4]

These Attributes are kept up-to-date at all times on each Object during runtime, and are updated every Scan Cycle. These Attributes are updated every Scan Cycle to represent the current statuses of the alarms. At least one of the attributes are kept up-to-date on each object during runtime and the attributes are updated every scan cycle to represent the current statuses of the alarms. Update is done in two phases:

During the execution phase, the aggregation statuses are updated for alarms on the Object itself. These updates are done in the ordinary execution order for Objects in an Area.

During the post-execution phase, the Scheduler invokes an operation on each Object in an Area starting at the lowest levels of the Model View hierarchy and working upward. Each Object ensures that its own aggregation values are updated and then performs a "bubble up" operation of those values to its parent, which combines the parent aggregation values with those of the child. This "bubble-up" operation takes place regardless of whether the Object is OnScan or OffScan.

If a child Object discovers that its parent Object is undeployed, it skips up to the grandparent Object and updates it. This skipping goes as many levels as needed until an ancestor is found that is deployed or the Area is reached, whichever comes first.

Note that the legacy InAlarm flag for the Object is not "bubbled-up." Only the new alarm aggregation attributes are "bubbled-up."

FIG. 7 illustrates one example of a hierarchy for bubble up of Alarm Aggregation Objects. For example, object 1A_1B 702 is a subobject of object 1A_1 704 which is part of area 1A 706 which is part of area 1 708. Thus, mode enable, in alarm TRUE, acked TRUE, severity 3 of object 702 bubbles up to object 704 and so on. Similarly, the other objects bubble up as illustrated in FIG. 7.

If there are no alarms configured on an Object or its descendants, these attributes have the following default values:

InAlarm=FALSE
AlarmMostUrgentSeverity=0
AlarmMostUrgentMode=AlarmMode of the object itself (the Common Primitive's Alarm State, Enabled/Silenced/Disabled)
AlarmMostUrgentInAlarm=FALSE;
AlarmMostUrgentAcked=TRUE
AlarmCntsBySeverity={0, 0, 0, 0}

Note: If there are no alarms configured on an Object or its descendants, then there are no Alarm Primitives executing to copy the Object's AlarmMode status to the AlarmMostUrgentMode attribute. However, the post-execute "bubble-up" operation executes on all Objects, whether they have alarms or not, whether they are OnScan or not, and makes sure AlarmMostUrgentMode is properly initialized every Scan Cycle.

Scan State and Data Quality of Alarm Aggregation Attributes:

Since alarms only update when an Object is OnScan, if an Object is OffScan, its own alarms will not contribute to the update of the aggregation values. However, in the Model View hierarchy an Object and its descendants may be in different scan states, so the statuses and data quality need to reflect this appropriately.

If an Object is OffScan, the status of the InAlarm flag is as follows:

InAlarm=False, Good quality

[Note: The InAlarm flag always retains Good quality. This is a legacy flag that was in place for 10 years prior to the addition of the Alarm Aggregation feature. So to avoid breaking existing user applications, the behavior of this flag's quality remains unchanged.] If an Object with no descendants is OffScan, the alarm aggregation statuses of the Object are the default values with Bad quality as follows:

AlarmMostUrgentSeverity=0, Bad quality
AlarmMostUrgentMode=AlarmMode of the object itself, Bad quality
AlarmMostUrgentInAlarm=FALSE, Bad quality
AlarmMostUrgentAcked=TRUE, Bad quality
AlarmCntsBySeverity={0, 0, 0, 0}, Bad quality Also note that for an Object that is OffScan, all the Alarm Primitives on that Object are forced to the state InAlarm=FALSE, so the Object does not aggregate its own alarms, which are all forced OFF. This is true whether the Object has descendants or not. For Objects with descendants, the "bubble-up" operation takes place even for Objects that are OffScan. Consequently, the aggregation values represent the combined values of the Object and all its descendants.

If an Object with descendants is OffScan, its own internal aggregation values are the defaults with Bad quality. The value and quality of the combined aggregation Attributes depend on whether the descendant Objects are OnScan or OffScan:

If all of the descendant Objects are also OffScan, the combined aggregation values for the parent are the default values with Bad quality.

If some of the descendant Objects are OnScan, the combined aggregation values for the parent include statuses and counts from those descendants, but the combined aggregation Attributes of the parent still have Bad quality.

If an Object with descendants is OnScan, then its own internal aggregation values are Good quality. Again, the value and quality of the combined aggregation values depends on whether the descendant Objects are OnScan or OffScan:

If all of the descendant Objects are also OnScan, the combined aggregation values for the parent also have Good quality.

If some of the descendant Objects are OffScan, the combined aggregation values for the parent have Uncertain quality. This represents that these are a combination of Good values and Bad values. This Uncertain quality propagates all the way up to the Area level.

Alarm Aggregation for an individual Analog Field Attribute is stored in the AnalogUtilities primitive that references the Field Attribute. The descriptions and statuses of the aggregation attributes are the same as for those in the Common Primitive, except that they apply ONLY to the individual Field Attribute and there is no overall InAlarm status for the Field Attribute.

If there are alarms configured on a Field Attribute but none of the alarms is in the InAlarm state or waiting to be Acked, the same default values apply as for the Common Primitive with no dependents.

If there are no alarms configured on a Field Attribute, then the default values are the same as for the Common Primitive except for AlarmMostUrgentMode, which remains Enable. This is because there are no Alarm Primitives executing to copy the Object's AlarmMode status to the Field Attribute's AlarmMostUrgentMode attribute. The AlarmMostUrgentMode attribute retains its initial value from start-up.

If the Object containing the Field Attribute is OffScan, the aggregation Attributes for the Field Attribute are the same as for an Object with no descendants, and all are default values with Bad quality.

Aggregation statuses for Analog Field Attributes are not separately "bubbled-up" from child Objects to parent Objects. They are already part of the overall collection of alarms configured on an Object, so they are "bubbled-up" as part of the Object's aggregation values.

Alarm aggregation for an Area or pseudo-Area includes all the alarms (1) on the Area Object itself, (2) on all Objects assigned to the Area, (3) all descendants of those Objects, and (4) all sub-Areas directly assigned to the Area in the Model View. The descriptions and statuses of the aggregation attributes are the same as for those in an Object, as the same Common Primitive attributes are used.

Scan State and Data Quality for Alarm Aggregation Attributes of an Area:

The Quality for the alarm aggregation attributes on an Area is generally the same as for Objects with descendants, with the following differences:

If the Area is OffScan, the alarms configured on the Area itself do not contribute to the Area's alarm aggregation values and are of Bad quality, just as for an ordinary Object. So the overall quality is Bad, with default values or combined values, depending on whether all the Objects assigned to the Area are OffScan or some of them are OnScan. But in addition, when the Area is OffScan, the aggregation statuses of sub-Areas are NOT retrieved in the post-execute phase. Even if those sub-Areas are OnScan and available, their statuses and counts will not be included in the parent Area's aggregation values.

Note: If a sub-Area is OffScan, even though it may have bubble-up aggregation from its assigned Objects, the PARENT Area will not be able to retrieve the aggregation attributes from this sub-Area. So even if the parent Area is OnScan, the parent's aggregation totals will NOT include the bubble-up aggregation values of the sub-Area that is OffScan. For quality information on the parent Area, see the bullet item immediately below.

If the Area is OnScan, the aggregation values for the Area and its Objects will have Good or Uncertain quality, depending on whether all the Objects assigned to the Area are OnScan or some of them are OffScan. But if the parent Area has one or more sub-Areas from which it cannot retrieve aggregation statuses (either because the sub-Areas are OffScan or communication has been lost), the aggregation Attributes for the parent Area are forced to Uncertain quality. This matches the behavior of the long-existing Attributes for AlarmOnCntTotal, etc.

Enabled/Disabled Alarm Aggregation

Alarm Aggregation may be disabled or enabled at an Area Level. The Notification Distributor primitive's "AlarmAggregationStateCmd" Boolean attribute will be true if aggregation is enabled and false if disabled. The default value of the attribute "AlarmAggregationStateCmd" is true, which means the Alarm Aggregation feature is enabled for a given area, and its child objects.

On Startup, the Area primitive will retrieve the value of the "AlarmAggregationStateCmd" Boolean attribute in its Notification Distributor primitive. Based on the attribute's value, the area will do the following:

If the value is true, all of the alarm aggregation functionality described above will be performed.

If the value is false,
  Area Object itself: Alarm aggregation functionality will not be performed for alarms configured within the Area object and attributes related to alarm aggregation must show default value
  Child Objects: Child objects of Area will not perform alarm aggregation functionality and attributes related to alarm aggregation must show default value.
  Sub Areas: Area object will not subscribe to the alarm aggregation values of sub area [pseudo area] even if Alarm Aggregation is enabled at the sub area level.

User will be able to configure attribute "AlarmAggregationStateCmd" from the Area object editor. Platform/Engine/DI object editor will not have the option to Enable/Disable Alarm Aggregation. Refer Area Object DFS for detail. User will not be able to change the attribute value at runtime.

Because these are Attributes, the following statements apply:

They will always be accessible in every Object, because they are part of the Common Object Primitive.

They will always be visible in Object Viewer, regardless of the state of the various alarms on the Object and regardless of whether the AlarmMode setting for those alarms (or for the Object itself) is Enabled, Silenced, or Disabled.

It is also important to keep in mind that these are Attributes, not alarms and not events—so they do not get registered with the Notification Distributor or reported to the Distributed Alarm System. They are not visible in clients such as the Alarm Viewer Control and do not get logged by the Alarm DB Logger.

Other components such as SAL graphics must access these Attributes by subscribing to them and/or performing GetAttribute( ) operations.

As noted above, some objects and ArchestrA graphics symbols—such as those in the Situational Awareness Library (SAL)—need an efficient and simple way to identify whether any alarms on an Object currently need attention, what is the overall status of the most important of those alarms, and how many alarms are presently active overall at each level of severity. In addition, they need alarm aggregation to summarize all contained Objects, following the Model View—so that the alarm information represents the Object and all levels below it. This makes it possible for a user to "drill down" from one level to the next and use aggregation to search for the underlying cause of a complex Object's alarms.

For an Object, aggregation represents the alarms on the Object, on all contained Objects, and on their descendants, down to the lowest levels of the Model View.

For an Area or pseudo-Area, aggregation represents the alarms on the Area Object itself, on all Objects assigned to the Area, and on all sub-Areas and their assigned Objects, down to the lowest levels of the Model View.

For an Attribute, aggregation represents all the alarms on the Attribute itself. This is the lowest level of aggregation.

In Summary, alarm aggregation takes a specific item that the user can point at within the hierarchy of factory hardware represented by objects and indicates "within that object and all of the objects within that object, what is the most important or severe alarm that is happening right now?" The alarm aggregation software instructions do not scan to find the most urgent alarm; instead the instructions notify the next layer up proactively what the most severe alarm is. The objects are proactively reporting changes in its alarm state up the hierarchy. Previous methods were to go from the top down to check severity on every little component. Some of the alarms could be suppressed at a lower level because there are different priority levels of alarms. The alarm severity and whether the alarm has been acknowledged can affect whether it is the most severe alarm.

Aggregation of Alarms for a Field Attribute:

Alarm Aggregation for an individual Analog Field Attribute is stored in the AnalogUtilities primitive that references the Field Attribute. The descriptions and statuses of the aggregation attributes are the same as those for an Object, except that they apply ONLY to the individual Field Attribute and there is no overall InAlarm status for the Field Attribute.

Propagation of Alarm Aggregation Through the Model View Hierarchy:

For the ArchestrA Application Server, all of the Objects in an Area are updated once per Scan Cycle. During a Scan Cycle, all of the Objects are updates using data values and alarm statuses that were finalized at the end of the PREVIOUS Scan Cycle. Then at the end of the Scan Cycle, the new data output values are published and the alarm statuses are updated. They will be used as calculation inputs during the next Scan Cycle.

For Alarm Aggregation, during a Scan Cycle the aggregation statuses for each Object and each Area are held unchanged. As each Object is executed, it generates a set of updated data and alarm statuses, including an internal set of updated alarm aggregation values that represent the new statuses of the alarms. At the very end of the Scan Cycle, a synchronization phase uses these internal aggregation values to calculate the new alarm aggregation statuses for all AppObjects in an Area and for the Area itself, which will become the published alarm aggregation statuses for the next Scan Cycle.

Aggregation statuses for a Field Attribute apply only to the Field Attribute itself. The internal aggregation statuses are simply copied to the published aggregation statuses.

For each AppObject, the internal aggregation statuses for the Object itself are combined with the updated aggregation statuses of all of its child AppObjects, grandchild AppObjects, etc. to produce the published aggregation status of the AppObject—which represents the AppObject itself and all of its descendants in the Model View Hierarchy.

For each Area, the internal aggregation statuses of for the Area itself (as an Object) are combined with the aggregation statuses of all its child AppObjects, grandchild AppObjects, etc. In addition, Alarm Aggregation combines the status of the Area and its AppObjects with the status of all sub-Areas under the Area in the Model View Hierarchy. In this way, the aggregation statuses of each Area represent the aggregation of all alarms in the Area Object, all of its descendant AppObjects, and all of its descendant sub-Areas.

Element Styles

As illustrated in FIGS. 1 and 5, also see the example of element styles user interface Appendix below, and FIGS. 9-17, a system manages human machine interface (HMI) applications for industrial control and automation. FIG. 5 is a screen shot of an interface for specifying an element style. In FIG. 5, the element style for an unacknowledged critical alarm is selected. The style includes text elements (Ts), fill elements (Fs) and line elements (Ls). It does not include outline elements (Ol). There are no overrides as indicated in the preview window. Software instructions stored on a tangible, non-transitory media and executable by a processor receive data indicative of a manufacturing/process control system being monitored and display a user interface indicative of a status of the manufacturing/process control system being monitored wherein the status is based on the received data. In addition, instructions define a set of user-defined graphical element style standards, granularly applicable to separate elements. Also, instructions responsive to user input configure a plurality of separate elements to be referenced to a particular graphical object representing a process control device of the manufacturing/process control system being monitored. The plurality of separate elements has the same user-defined graphical element style standards. The properties of the plurality of separate elements are defined by the particular graphical object so that the user configures the plurality of separate elements without accessing each of the plurality of separate elements. In various embodiments, these instructions may be part of a system, and/or may be part of software instructions stored on a tangible, non-transitory media and executable by a processor, and/or may be a processor executable method.

The graphic styles for all application elements in a galaxy are centrally managed and distributed. This enables a user to change the appearance of an application element without going into the application element and modifying specific properties of its graphic elements, for example, colors, fonts or line.

Element styles comprises processor executable software instructions stored on a tangible, non-transitory media (e.g., a memory device) and executed by a processor/server to provide a set of graphical element style standards, granularly applicable to separate elements referenced to a graphical object representing a process control device, such as a valve within a pump. The style standards prevent the user from having to modify colors or line widths manually. Any change to an element style results in an update to all references to the element style in the "galaxy". User defined styles may be built upon default (predefined) styles. Instructions responsive to user input modify an element style of the particular graphical object and instructions change the element style of the plurality of separate elements to have the same user-defined graphical element style standards as the modified element style of the particular graphical object.

The keyword here is "standards". Element styles are a way for users to codify their graphic standards when it comes to color, line thickness, font, font color, line style, etc. The way this comes together is by exposing the ability for the user to utilize a set of standard style names (predefined). Some of these the user can change, and some are locked down. Using our domain knowledge, the software recommends styles for the user's graphic elements to apply as is suggested by the styles.

The user can change aspects of the style (line thickness, font, font color, etc.). The user can use the style name throughout the system in the same way. Styles are provided and propagated in unique ways. For example, in one implementation, if the user have a pump, the pump may have 100 element styles. The user may want only the interior to go black based on one style. The user is provided with ways to granularly apply these styles to various elements. The user is also provided with defaults for various styles. This allows the user to assign different styles to different parts of the pump.

The styles have an order of precedence within the styles themselves. They fall back on one another in certain situations. Styles can build upon the existing styles that may be applied. In one form, these are not "cascading styles". The styles have defaults and allow building on styles. Upper level style changes are not pushed down to explicitly set styles at the lower level, but it will push down to defaults.

Thus, the element style feature provides the ability for the user to centrally manage the styles for all application in a galaxy. It enables user to change appearance of the application without going into the application and modifying specific properties of graphic elements, for example, colors, fonts or line.

In one form, the element style feature provides a set of predefined element styles. These styles can be used as standard styles that can be applied throughout the applications in the galaxy. A user is able to modify the properties of the predefined styles for building a element style to suit a need. A set of custom styles is also provided for the user to create customized styles. The style library configuration dialog can be launched from the IDE.

An element style can be exported from one galaxy and imported into another galaxy using the XML format. Validation is performed when importing an xml file to ensure the file contain the correct format. Thus, objects are groups into galaxies and a processor executes instructions for exporting a user-selected element style of objects in a first galaxy and for importing the user-selected element style into a second galaxy using an XML format. The procosser also executes instructions for validating the imported XML file to ensure the imported XML file contains a compatible format with the second galaxy.

Whenever a user is changing the properties of the element style in the style library, the changes will be automatically be propagated to all runtime nodes so that the user does not have to redeploy the applications.

To use the element styles defined in the style library, in the graphic editor the user can configure the graphic element to use the styles from the style library. The user also use element style animation to apply the styles from the style library in runtime.

In summary, with the element style feature, the user has the ability to utilize preexisting element styles or custom element styles that can be referenced in the user's graphics and animations. If the user changes the properties of the element in the galaxy, all the graphics and animations referencing the element style will be updated to reflect the change.

Figure 9:
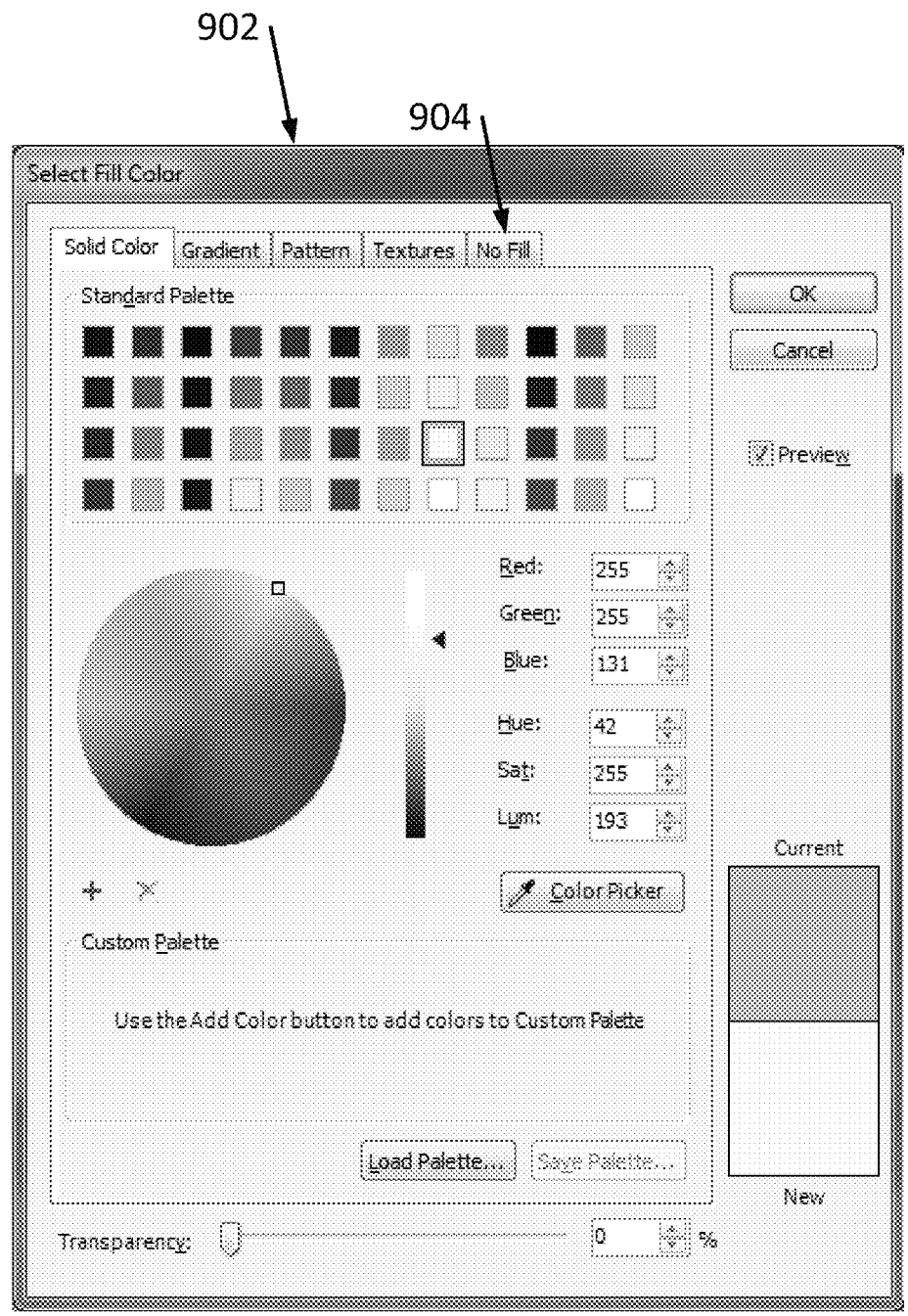
FIG. 9 illustrates one example of a screen shot comprising a standard ArchestrA color selection dialog boxt including a No Fill tab.

FIG. 5 is a screen shot of an interface for specifying element styles. The styling of elements includes one or more of the following (See the example of element styles user interface and FIGS. 9-17):

Font selection via a font selection dialog box;
Color section (color, gradient, pattern, textures) via a color section dialog box 902, including an optional "no-fill" tab 904 as shown in FIG. 9.

Figure 8:
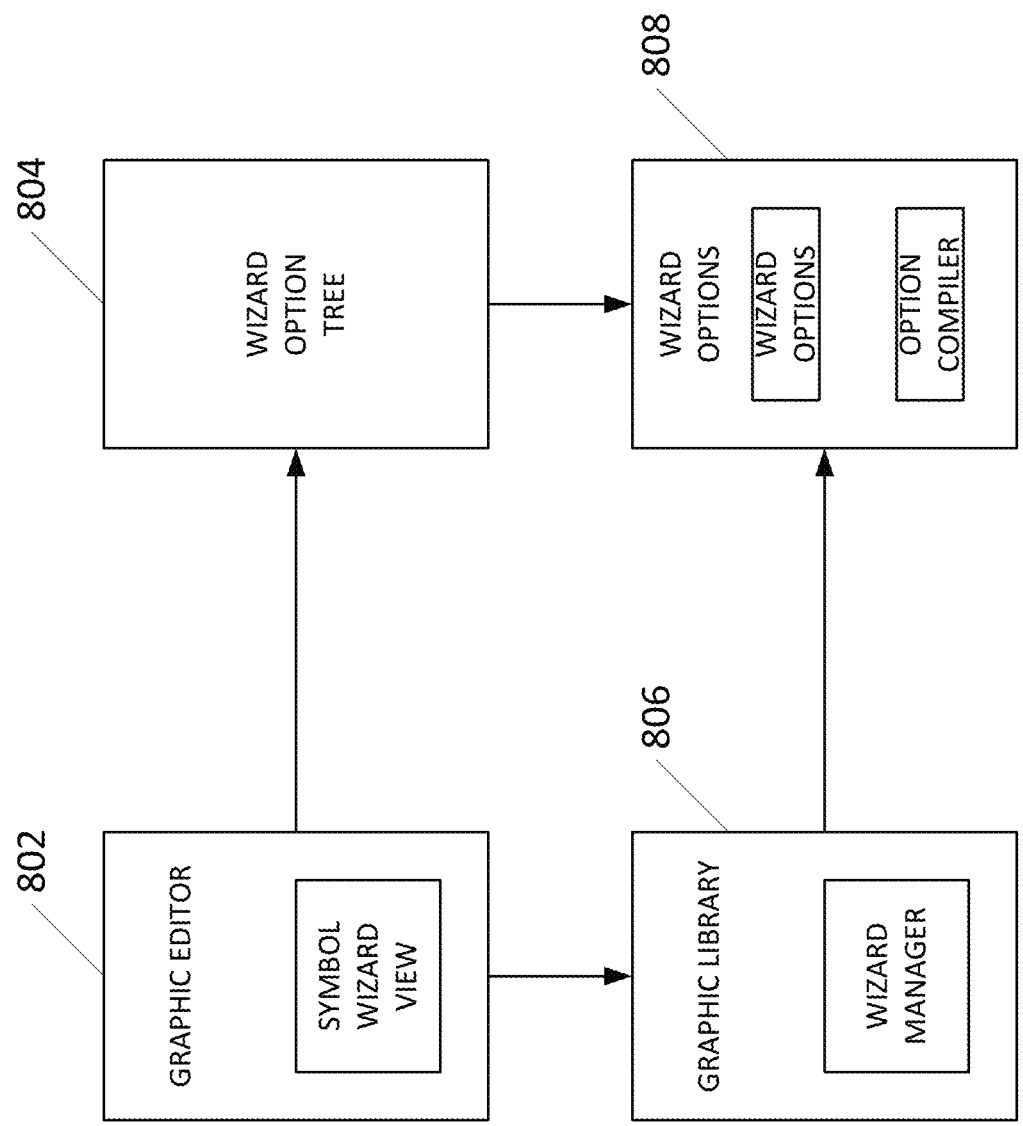
FIG. 8 illustrates one example of a component layout for a symbol wizard which enables user configurable encapsulation of process graphic functionality, which includes graphic elements, scripting and process variables.
Figure 10:
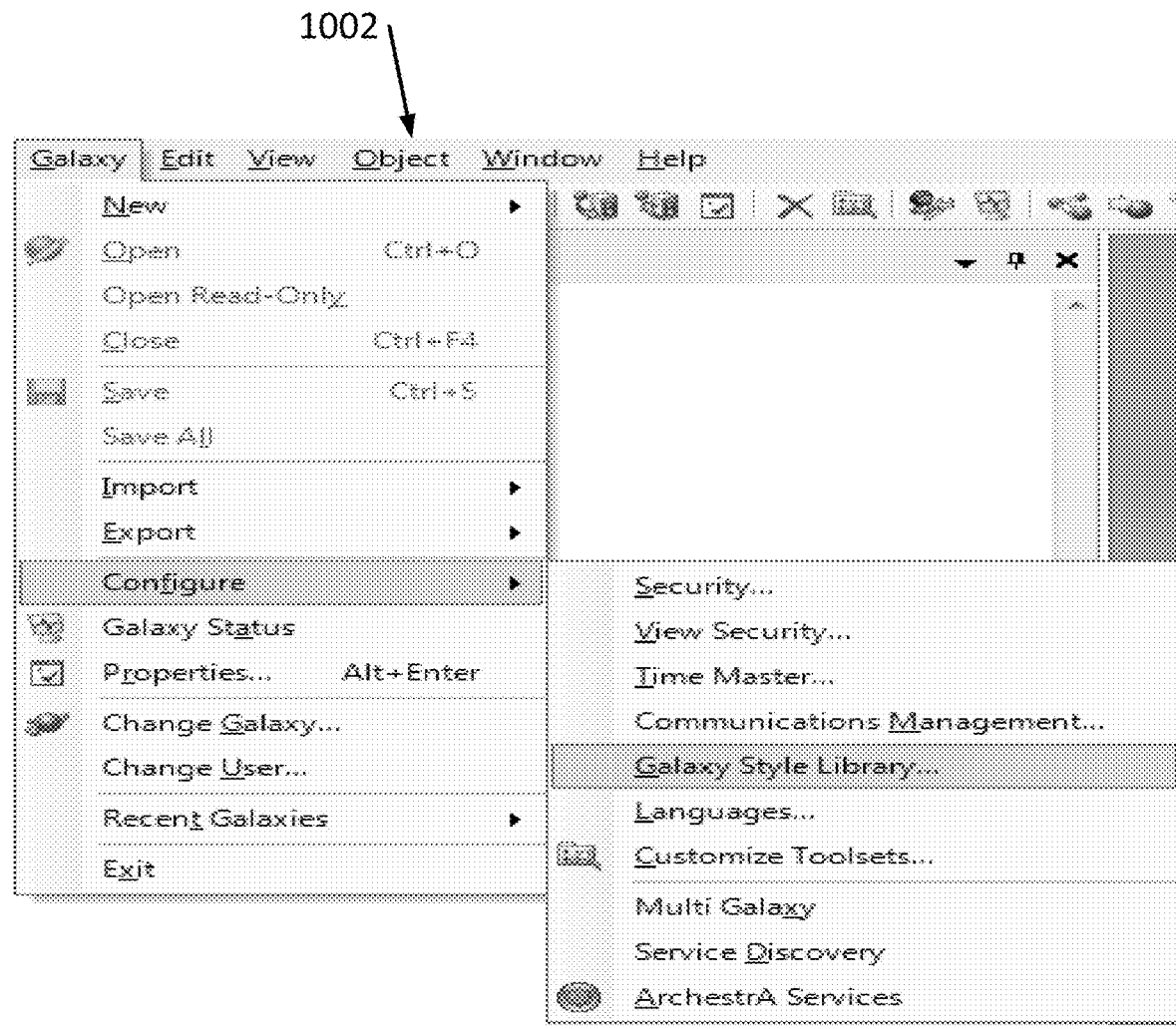
FIG. 10 illustrates one example of a screen shot of a proposed Galaxy Style interface.
Figure 11:
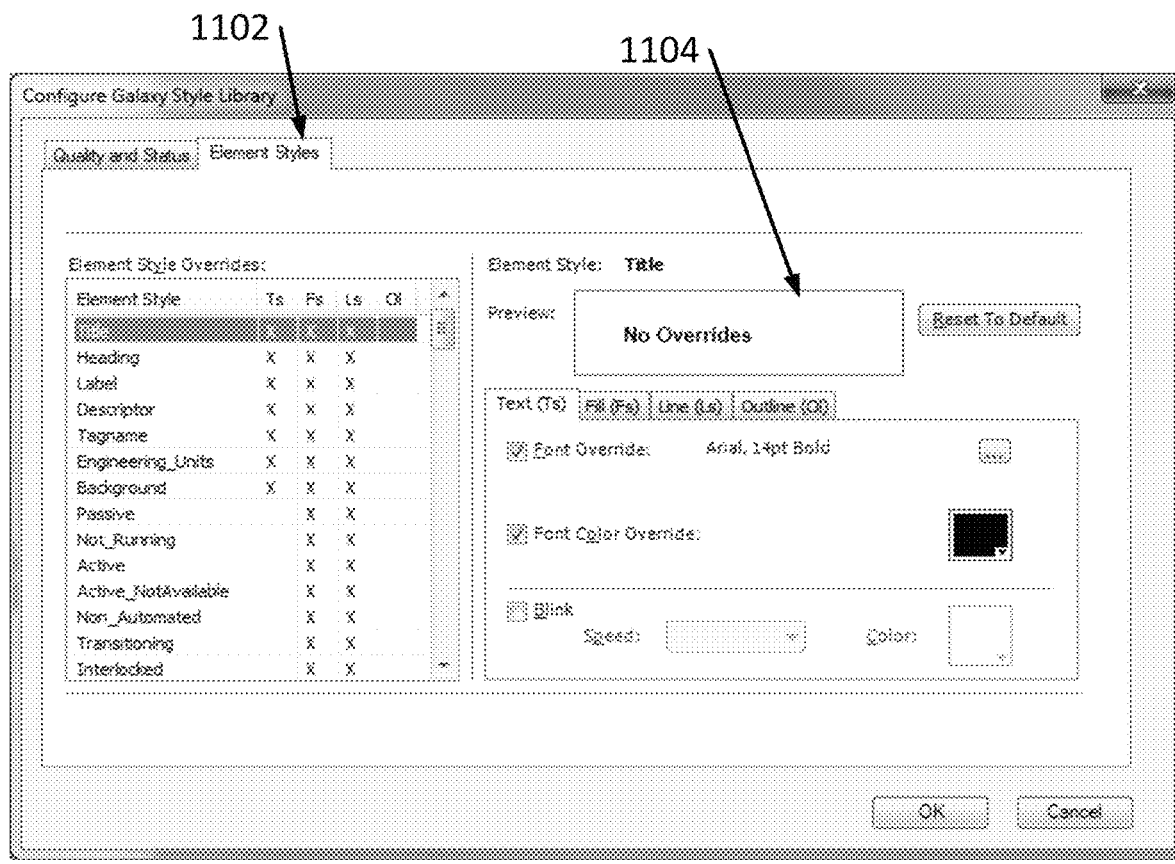
FIG. 11 illustrates one example of a screen shot of the Element Styles tab of a Configure Galaxy Style Library Interface box.
Figure 12:
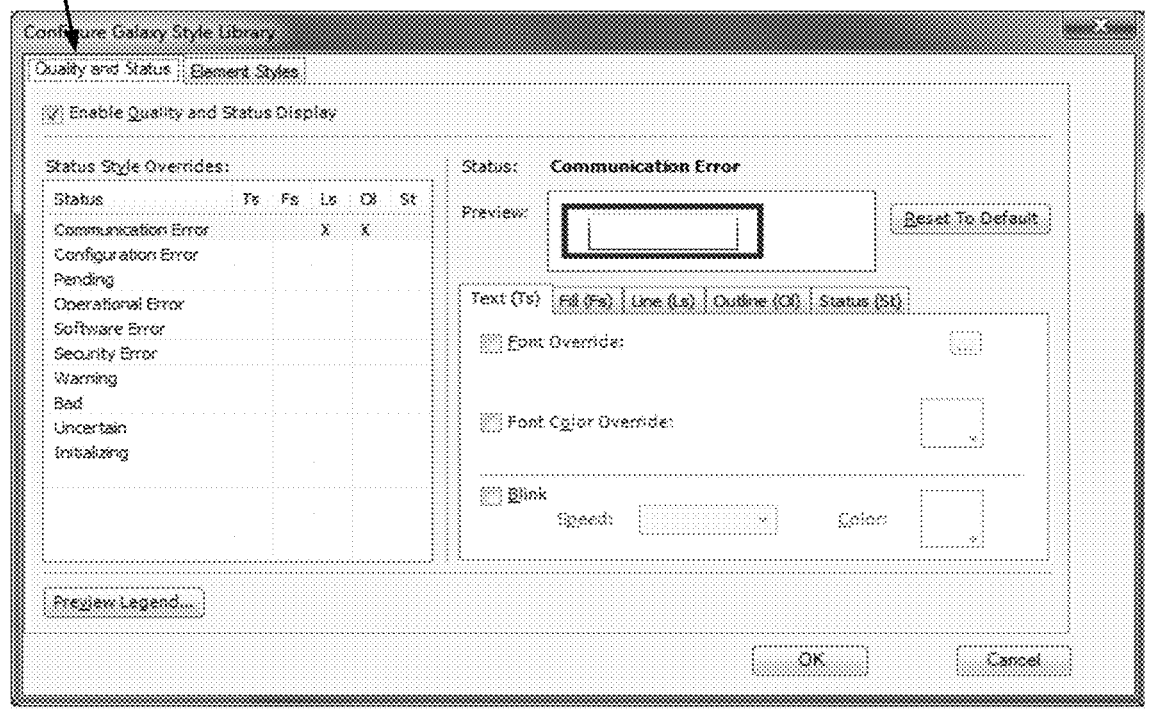
FIG. 12 illustrates one example of a screen shot of the Quality and Status tab of a Configure Galaxy Style Library Interface box.
Figure 13:
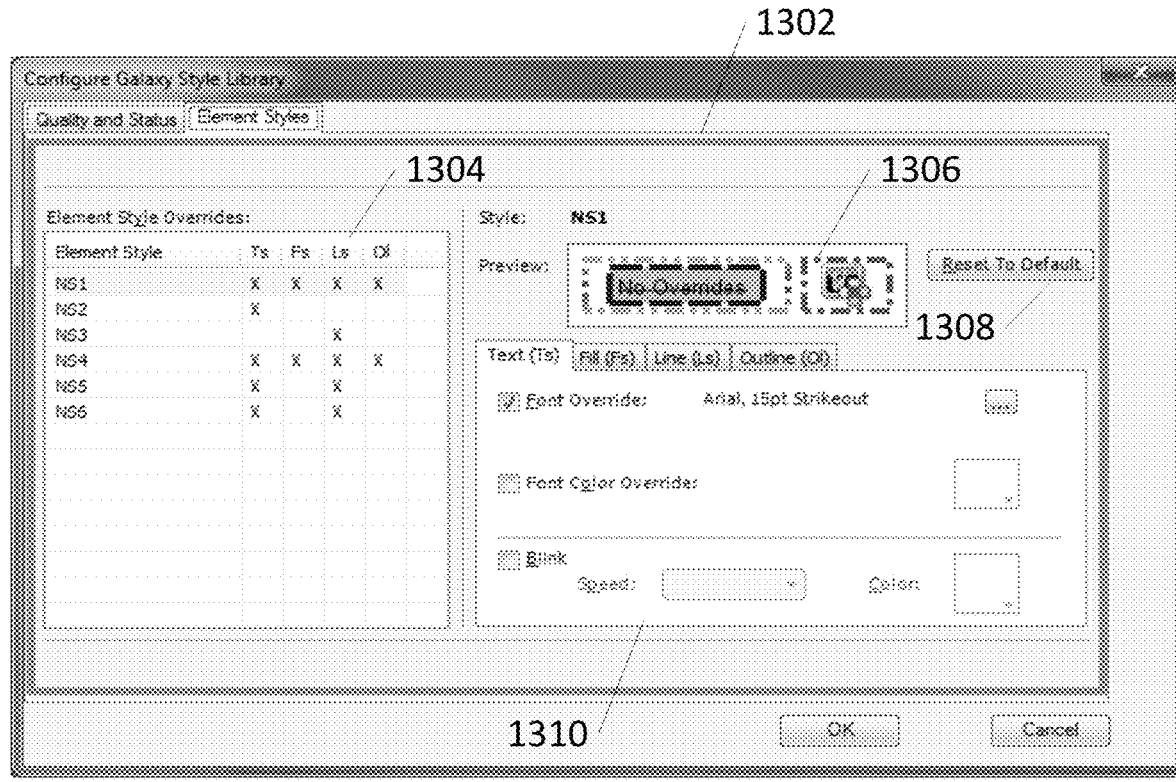
FIG. 13 illustrates one example of a screen shot of the Element Styles tab of a Configure Galaxy Style Library Interface box when overrides have been selected.
Figure 14:
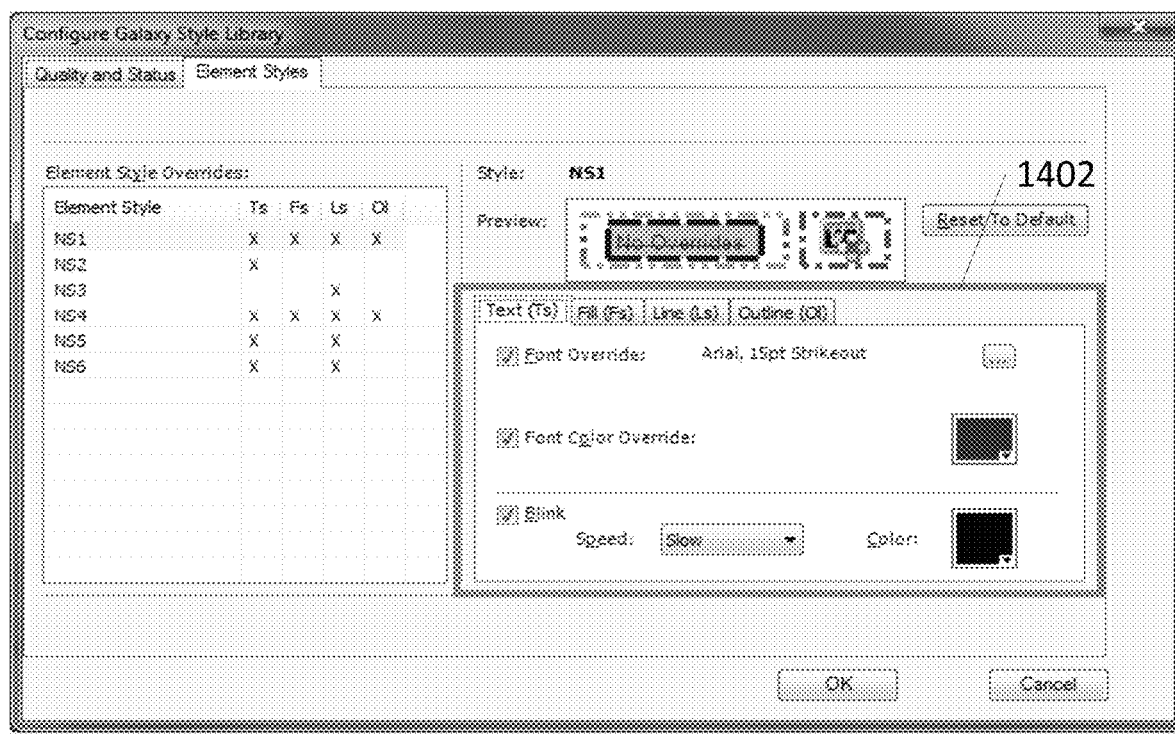
FIG. 14 illustrates one example of a screen shot of the Element Styles interface text tab of a Configure Galaxy Style Library Interface box.
Figure 15:
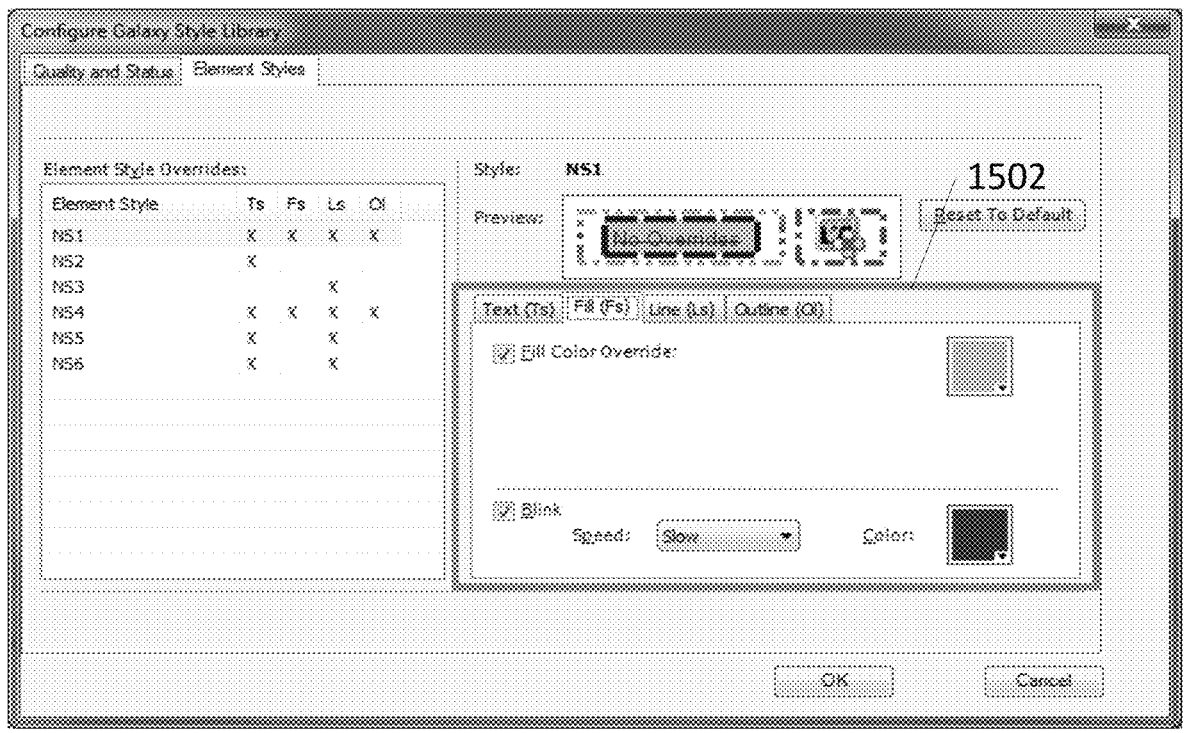
FIG. 15 illustrates one example of a screen shot of the Element Styles interface fill tab of a Configure Galaxy Style Library Interface box.
Figure 16:
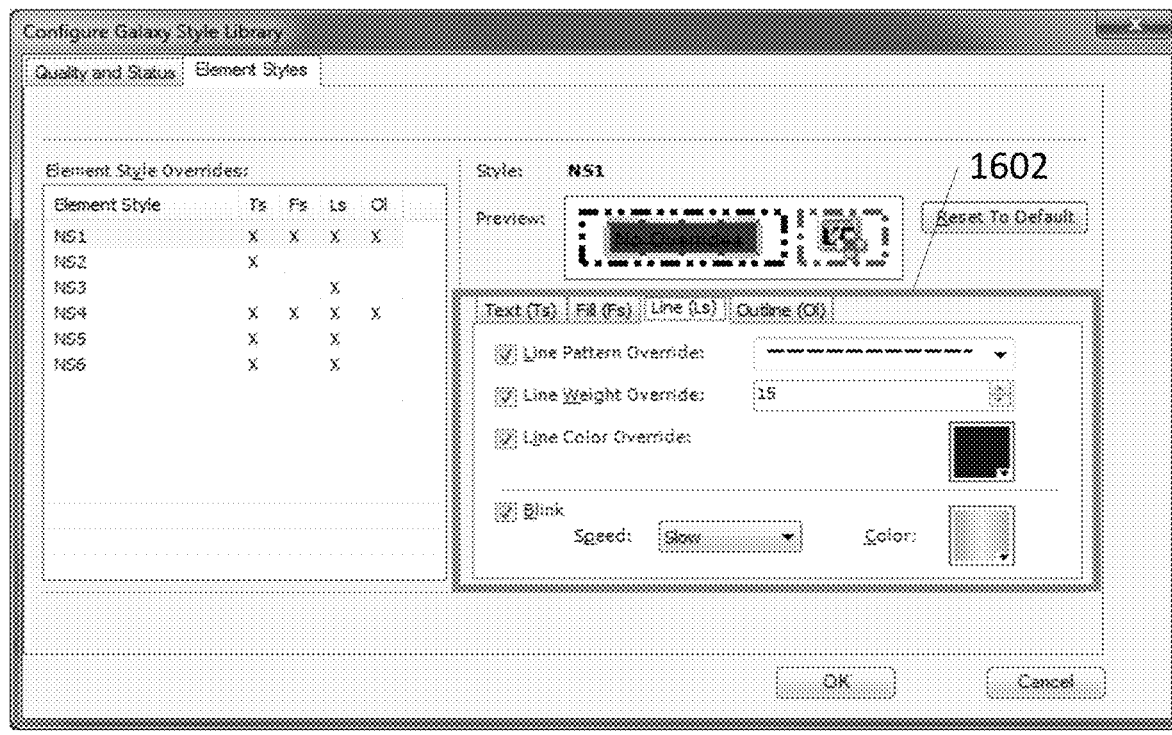
FIG. 16 illustrates one example of a screen shot of the Element Styles interface line tab of a Configure Galaxy Style Library Interface box.
Figure 17:
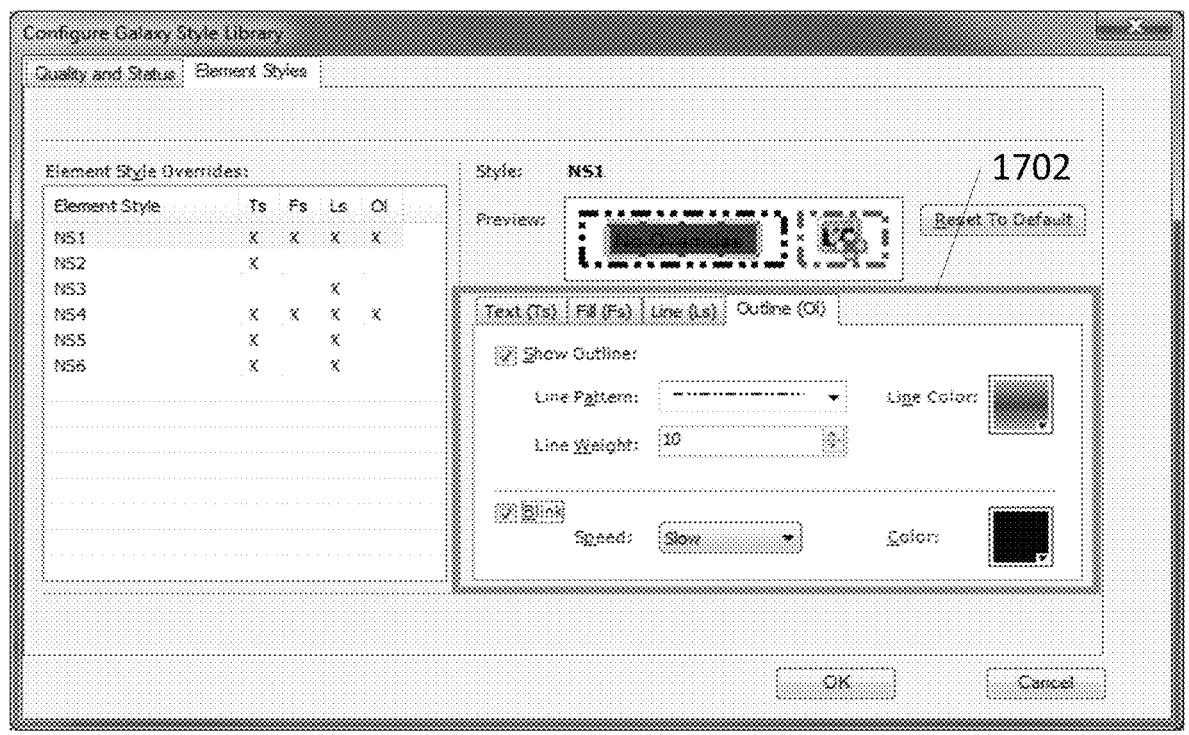
FIG. 17 illustrates one example of a screen shot of the Element Styles interface line tab of a Configure Galaxy Style Library Interface box.

Purpose
User Interface 1002 as shown in FIG. 10 providing various configure options including "Galaxy Style Library."
Launch Point
Element Styles user interface tab 1102 of the Configure Galaxy Style Library interface as shown in FIG. 11, which indicates at 1104 that "no overrides" have been applied to element style "Title" having text,fill and line features.
Quality and Status user interface tab 1202 of the Configure Galaxy Style Library interface as shown in FIG. 12 indicating line and outline communication error.
Behavior
Text style
Symbol Wizards As illustrated in FIGS. 1 and 8, a system manages human machine interface (HMI) applications for industrial control and automation. Software instructions stored on a tangible, non-transitory media and executable by a processor receive data indicative of a manufacturing/process control system being monitored and display a user interface indicative of a status of the manufacturing/process control system being monitored wherein the status is based on the received data. In addition, instructions define a set of designer-defined graphical element style standards, granularly applicable to separate elements. Also, instructions responsive to designer input configure a customized symbol wizard for use by the designer for generating symbols according to a customized, designer-defined template corresponding to at least one of the designer-defined graphical element style standards. The software instructions stored on a tangible, non-transitory media are executable by a processor. A processor executable method is provided. In various embodiments, these instructions may be part of a system, and/or may be part of software instructions stored on a tangible, non-transitory media and executable by a processor, and/or may be a processor executable method.

FIG. 8 illustrates one example of a component layout for a symbol wizard which enables user configurable encapsulation of process graphic functionality, which includes graphic elements, scripting and process variables. The arrows indicate assembly references. A graphic editor component 802 mainly contains the user interface for the graphic symbols and provides a symbol wizard view. The graphic editor component 802 indicates assembly references to a wizard option tree component 804 and a graphic library component 806. The wizard option tree component 804 contains the user interface for configuring the wizard options. The graphic library component 806 is mainly used for rendering the graphics during runtime and design time. The graphic library component 806 provides a wizard manager. The wizard option tree component 804 and the graphic library component 806 indicate assembly references to a wizard options component 808. The wizard options component 808 contains the wizard option configurations and the option compiler.

In summary, the symbol wizard creator is a powerful and flexible tool that allows a symbol wizard designer to create a complex, composite symbol wizard that exposes a configuration that allows a subsequent user to configure objects/elements according to the subsequent user's specific needs within the parameters of the symbol wizard created by the symbol wizard designer. Using the Symbol Wizard, subsequent users can create a customized symbol which has different locations of elements than other similar symbols within the parameters of the symbol wizard created by the symbol wizard designer.

Symbol wizards provide a configurable encapsulation of process graphic functionality, which includes graphic elements, scripting and process variables. The symbol wizard comprises processor executable software instructions stored on a tangible, non-transitory media (e.g., a memory device) and executed by a processor/server formatting a wizard generator designed to provide the user with modifiable symbol generators. The symbol wizard creator enables the design and modification of a customized symbol wizard for generating symbols according to a customized, user-defined template, which enables a higher level of involvement from a user without the need for knowledge of object oriented programming languages. The user is able to design each symbol wizard according to their own standards in terms of the elements, scripts, and process variables contained in each wizard.

A problem that users have faced in the past is that the user has low level tools to build graphics, but the user who is assembling the graphics for a particular application does not have the time or desire to use such low level tools to maintain a consistent design. The user wants to visualize things on the factory floor and has been give premade symbols to use in the visualization. If they change a symbol, they have drill down and get into lower, granular graphic levels to make their changes. The symbol wizard makes it easier to consistently create similar symbols for a particular application. For instance, with regard to a library-provided pump symbol, the user can configure whether the pump symbol displays a meter.

In the past, users have made change by modifying programming languages and compiling the modified languages. At least some users have domain knowledge so that symbol wizards will allow them to craft their symbols with more options they can change, without requiring programming. Symbol wizards also provide a tool for companies making their own symbols as well. A high end user can use symbol wizards design, craft, deploy and distribute the configurable wizards, and then another level of users have the ability to use these symbol wizards to design the necessary symbols. The wizard designer builds all the logic of each symbol wizard through click and point. Then the symbol wizards are handed-off to a application assembler who takes the symbol wizard from a toolbox of available symbol wizards and uses them in their application.

The symbol wizard enables user configurable encapsulation of process graphic functionality, which includes graphic elements, scripting and process variables. The symbol wizard functionality gives the symbol wizard designer the ability to create Graphic Symbol Wizards within the ArchestrA Graphics Editor that can represent any number of unique combinations of Graphic Elements, scripts, and process variables as a single symbol wizard.

This solves the problem of the designer being required to create multiple symbols for a complex process graphic. The symbol wizard enables the designer to create a single symbol wizard which encapsulates multiple process graphics.

A user of the symbol can drag-and-drop the symbol onto the user's drawing canvas and configures the wizard instance to match the user's specific needs. Wizard Layers are a means to group process graphic contents which define a specific subset of functionality to be encapsulated, which can be enabled conditionally through wizard rules. The contents of a layer will be included in the runtime environment if it is enabled; otherwise, it is not included. This has the effect of greatly reducing the runtime system resource requirements and utilization on the visualization node.

Wizard Rules allow the designer to use wizard options 808 to construct Boolean logic statements which enable or disable layers. Wizard options 808 are created by the designer to allow the Application Engineer to selectively enable or disable encapsulated functionalities within the Symbol Wizard. Choice Groups are created by the symbol wizard designer to group one or more, mutually exclusive choices. Choices are created by the symbol wizard designer to represent a single configuration related to a subset of functionality within the process graphic. Options are created by the symbol wizard designer to represent a Boolean toggle of a single configuration related to a subset of functionality within the process graphic.

In the graphic editor 802, the wizard designer is able to design and create options and choices for a particular symbol wizard through a user interface. These options and choices will be exposed to a user of the particular symbol wizard as optional configurations. The designer can hide or show the options and choices by configuring a rule expression for each option that will be evaluated to true or false.

A layer concept is also introduced in the graphic editor 802 to allow wizard designer to show and hide group of graphics and custom properties. The user can associate graphics to the layer by a drag and drop function. Beside graphics, the user can also associate local custom properties and named scripts to the layers. Hiding or showing the layers is determined by the evaluation of the configured rule expression which driven by selection of choice or option that create by the wizard designer.

Trend Pen

As illustrated in FIGS. 1, 3A-3E and 4A-4F, a system manages human machine interface (HMI) applications for industrial control and automation. Software instructions stored on a tangible, non-transitory media and executable by a processor receive data indicative of a manufacturing/process control system being monitored and display a user interface indicative of a status of the manufacturing/process control system being monitored wherein the status is based on the received data. In addition, instructions display graphic elements as part of the user interface wherein each element is associated with and indicative of an alarm status of one or more aspects of the manufacturing/process control system being monitored. Also, instructions responsive to user input render a visualization window in a single trend line of blended data including (1) received real time data of a process variable of the manufacturing/process control system being monitored and (2) historical data of the process variable of the manufacturing/process control system being monitored. In various embodiments, these instructions may be part of a system, and/or may be part of software instructions stored on a tangible, non-transitory media and executable by a processor, and/or may be a processor executable method.

A trend pen renders and enables visualization by a plant operator or other user of blended real time and historical data of a process variable in a single trend with minimum configuration. One benefit is its extremely high performance and the ability to support 100's of trend pen elements displayed in a single process graphic window without performance degradation.

Trend pen is a real time trend with historical backfilling with any additional data needed with historical data for a historian server to define a single trend line, comprising processor executable software instructions stored on a tangible, non-transitory media (e.g., a memory device) and executed by a processor/server providing a process variable visualization tool, designed to provide the user with a depiction of simplified trend data which requires minimum configuration. The user is able to configure the time period and whether the window remains fixed, or moves as time progresses. Many other functional aspects of the tool are automatically configured, resulting in ease of access by the user.

For example, a user may have a level meter on a tank which changes in levels over 2 hours. It's being filled. The user is not going to stare at that meter and remember what the rate of change was. The user wants to just see a simple curve of where it's been in the last two hours. The trend pen is lightweight, does not have an x/y axis, and does not have labels or scrollbars. It is a squiggly line that hangs off the side of a meter. Thus, real time trending is "heavy" on information.

A standard use case might be that a user has 10 tanks on a screen that are holding oil. The system is able to provide a screen showing where each tank has been over a past time period. Data is typically collected when the screen is open, but data is also collected in the historian. The trend pen will go to the historian and request the data from the desired period at the desired granularity for visualization. Thus, the user doesn't have to leave the screen up and running all the time.

When the trend pen screen is opened, it will determine what meters it needs to figure out trending for, what time period to pull data from the historian, how many data points are necessary to be useful for presenting a single line, what scale to use, etc. It presents it as a simple line that makes intuitive sense to the user based on what meter is being visualized.

The trend pen enables a plant operator or other user to visualize real time and historical data of a process variable in a single trend with minimum configuration. It is a high performance process graphic element that displays the performance of a process variable over a short period of time. Many trend pens can be displayed in a single process graphic window without performance degradation.

The trend pen element is configured to work with various type of meters, such as flow meter. A user of trend pen can drag-and-drop the trend pen element onto the canvas and attach a meter symbol to it. The trend pen element configuration option allows the user to configure process variables to be monitored.

The trend pen automatically detects the historian server which attaches to the current platform. It makes a call in the background to retrieve historical data for the configured process variable and render the trend base on the historical data. This reduces the configuration effort since it may not know the name of the historian server. The trend will pick up the real time data from the configured process variable and plot it on the same axis together with the historical data for the configured time period. The advantage is the user will see trending for both the historical and real time data based on the configured time period.

Trend pen allows two operation modes, one is a fixed window (Absolute Time Range) and the other is a moving or trending window (Moving Window Time Range). The fixed window allows a user to enter a start and a end time. The time range is automatically calculated for the moving window mode.

A user is able to configure the time period for the trending window. The trend pen will retrieve the historical data based on the configured time period. The trend pen exposes start time and end time properties which are automatically calculated based on the time period. This allows users to configure the starting in the fixed window mode. The refresh cycle is automatically calculated based on the width of the trend pen visualization window (configured by the user) and the time period of the visualization window. For example, the refresh cycle may be a percentage of the time period based on the width. As a specific example, it the width is one inch which corresponds to a 10% refresh rate and the time period is one hour, then the refresh rate would be six minutes or 10% of one hour. As another specific example, it the width is three inches which corresponds to a 5% refresh rate and the time period is 2.5 hours, then the refresh rate would be 7.5 minutes or 5% of 2.5 hours.

The trend pen provides users the ability to view real-time and historical data replay together on the same trend. One objective of the trend pen is to provide additional information about the object (e.g., meter or agitator) which allows users better understanding the behavior of the process variable being visualized.

This trend pen is designed in such a way that a user only needs to perform minimum configuration. It will automatically detect the remote historian nodes where the process variable is historized. The trend pen provides the scalability and performance to have more than 100 to 200 trends on single a window. This solves the problem of maintaining separate trend for historian or real-time and cumbersome process of picking reference in each database. Users can update the target reference and its period in runtime.

In the Absolute Time Range mode, a graphic symbol is shown for the first time, animation will get the data from historian based on the configured start time and end time. The data from that point in time forward is plotted using live data until the end time, as illustrated in FIGS. 3A-3E. For example, FIG. 3A illustrates a plot from left to right of the data 302 beginning 8:00 am as of 8:15 am. FIG. 3B illustrates a plot from left to right of the data 304 beginning 8:00 am as of 8:30 am. FIG. 3C illustrates a plot from left to right of the data 306 beginning 8:00 am as of 8:45 am. FIG. 3D illustrates a plot from left to right of the data 308 beginning 8:00 am as of 9:00 am. As illustrated in FIG. 3E, trending halts at the end of a fixed time period 310 (e.g., 8:00 am to 9:00 am). Thus, FIG. 3E illustrates a plot from left to right of the data 312 between 8:00 am and 9:00 am as of 8:15 am. In this regard, instructions enable a user to configure a time period for the visualization window wherein the visualization window comprises a fixed time period having a start time and an end time specified by the user.

In the Moving Window Time Range mode, a graphic symbol is shown for the first time, trend tail animation will get the data from the historian based on the configured time period. From that point in time forward, the trend is drawn using live data.

When getting data from Historian it will use,
Start Time="Time when request is made—Period"
End Time=Time when request is made
    The latest data will be shown on the Y axis. The simple trend graphic element or animation will not draw any X axis or Y axis as part of the visualization. The Y Axis referred to here means anchoring of trend (which is configured using a property of the trend element).

In the Time Period Configured mode, when getting data from historian, it will get data based on the time period configured. Initial trend data is captured and as time passes the additional data is visualized so that the trend line continues moving away from the Y-axis, falling off as time passes. For example, see the illustrations in FIGS. 4A-4E. For example, FIG. 4A illustrates a plot 402 from right to left of the data beginning time 1 ago and ending now. FIG. 4B illustrates a plot 404 from right to left of the data beginning time 2 ago and ending now. FIG. 4C illustrates a plot 406 from right to left of the data beginning time 3 ago and ending now. FIG. 4D illustrates a plot 408 from right to left of the data beginning time 4 ago and ending now. FIG. 4E illustrates a plot 410 from right to left of the data beginning time 5 ago and ending now. Thus, as illustrated in FIGS. 4D and 4E, the trend 412 continues moving away from the y-axis, falling off at some time (e.g., "now—4") as time passes. In this regard, instructions enable a user to configure a time period for the visualization window wherein the visualization window comprises a moving time period which changes as time progresses having a period of time specified by the user. Thus, start time and end time properties for the visualization window are determined based on the time period.

Figure 4F:
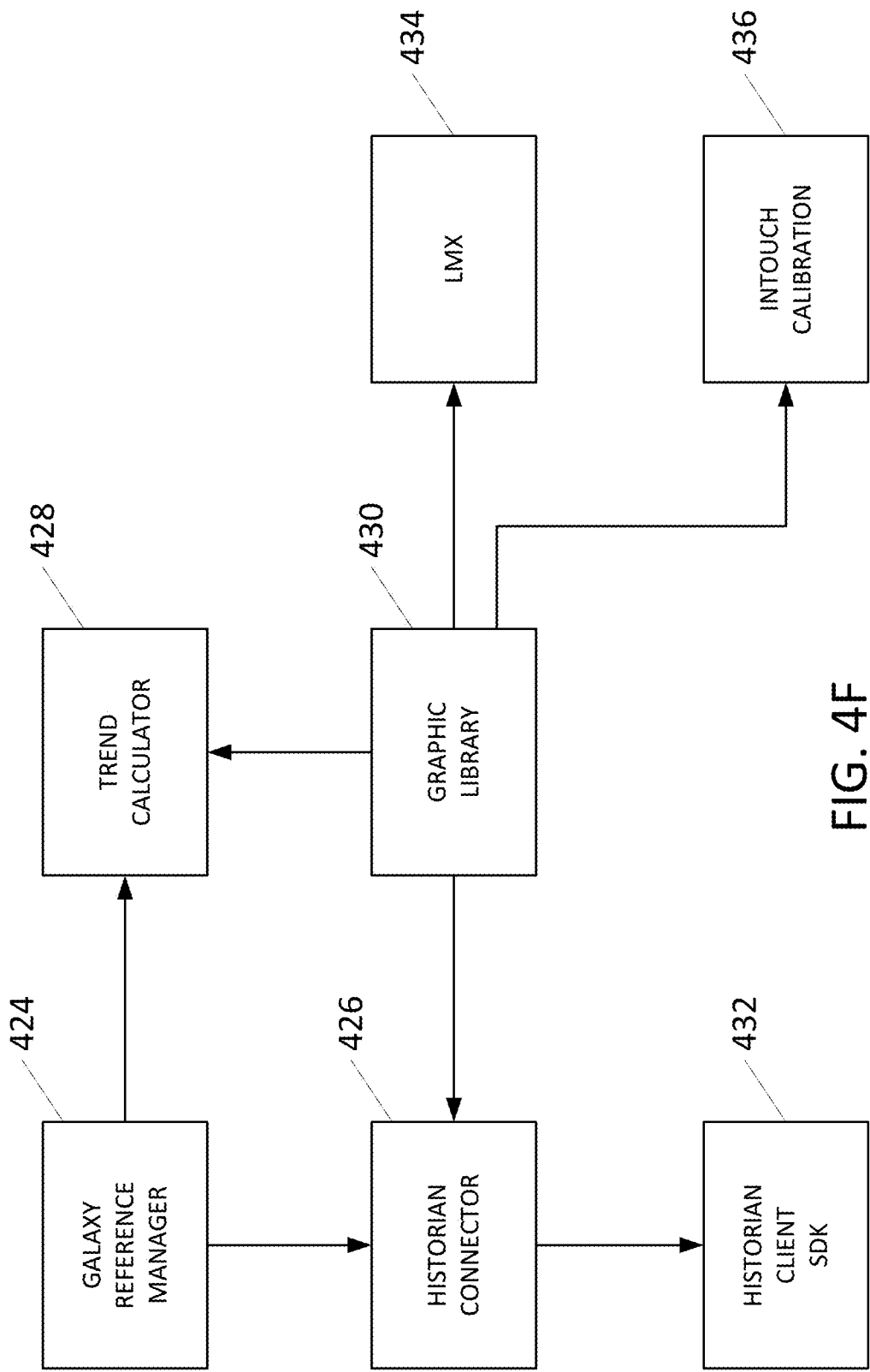
FIG. 4F illustrates an exemplary layout of trend pen components.

The trend pen also supports clipping and auto out of range capabilities with shading area under the curve. FIG. 4F illustrates an exemplary layout of trend pen components. A Galaxy Reference Manager component 424 supplies a historian connector component 426 and a trend calculator component 428 with reference information. The historian connector component 426 and the trend calculator component 428 may be reused in the INTOUCH system. A graphic library component 430 supplies the historian connector component 426 and the trend calculator component 428 with a graphics library. The historian connector component 406 supplies a historian client software development kit (SDK) component 432. The historian SDK component 432 delivers a set of binary executables which expose a set of application programming interfaces (APIs) used by the Trend Pen animation to retrieve historical data, for the trended process variable, from the historian data storage system. The historian connector component 426 is responsible for managing connections to historian servers and to get history data from connected historian servers. The trend calculator component 428 is responsible for calculating the trend plot points by taking into account the trend animation parameters, runtime data and history data. It outputs an array of points that will be used by the simple trend graphic element to render a curve. The trend calculator component 428 is not dependent on the other assemblies, except the required .Net Framework assemblies. The graphic library component 430 supplies a local message exchange (LMX) component 434 and an InTouch calibration component 436. The LMX component 434 exposes a set of APIs and underlying services which provide access to locally cached process variables and system parameters at runtime, subscription services for real-time updates of the same, and a robust discovery capability at both design-time and runtime. The Trend Pen animation utilizes the discovery service to find the source of the trended process variable, then uses the subscription functionality to register for real-time updates for the trended process variable. Other optional parameters include:

1. Trend Pen plots use Line (Slope) mode, as compared to a RT (real-time) Trend having 4 options (Auto, Line, Step Line & Point)
2. When historical data is not present, initial historical plotting is BLANK in the trend pen, as compared to RT Trend plots presenting a straight line.
3. When quality is BAD (e.g., below a minimum resolution), the Trend Pen plots a BLANK graph, as compared to RT Trend plots presenting a straight line with last known good value.

Thus, the trend pen is a powerful and flexible graphic element that allows designers to build and use Single PV (Point-of-View) or multiple PV trends with applied element styles which can be either included as part of existing graphics or shown as a pop up graphic to provide historical and real time trends and to allow the user to make informed decisions. This trend is primarily used by users to quickly understand the historical and real time behavior of a PV to detect the situation and guide the user about the variability of the PV and is usually used in meters (e.g., a flow meter, a miscellaneous meter, and a pressure control meter) which are set of advanced process graphics in the symbol library.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

Throughout the specification and claims, terms such as "item," "element," "object," etc. may be used interchangeably to generically describe or identify software or display features unless otherwise indicated.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A system comprising:
   a human machine interface (HMI) system coupled to the manufacturing/process control system being monitored, said HMI system configured and arranged to receive data from a plurality of sensor/control elements generating data indicative of a monitored manufacturing/process, said HMI system comprising:
   a processor receiving data from the sensor/control elements indicative of the manufacturing/process control system being monitored; and
   software instructions stored on a tangible, non-transitory media and executable by the processor, said instructions comprising:
   instructions for displaying a user interface indicative of a status of the manufacturing/process control system being monitored, said status being based on the received data;
   instructions for displaying graphic elements as part of the user interface, wherein at least one of the graphic elements is an alarm graphic element associated with and indicative of a status of a plurality of alarms of aspects of the manufacturing/process control system being monitored, and wherein the alarm status of each alarm graphic element is a function of the status of its associated plurality of alarms;
   instructions for specifying a user-defined level of hierarchy for the plurality of alarms of each alarm graphic element;
   instructions for aggregating the status of the alarms of a particular one of the alarm graphic elements;
   instructions for exposing a severe alarm associated with the particular alarm graphic element when the status of at least one alarm is above the user-defined level of hierarchy;
   instructions for determining one or more sub-objects of the particular alarm graphic element by analyzing the objects of the hierarchy of the particular alarm graphic element from the bottom up instead of from the top down, and for exposing an alarm of the determined sub-objects, wherein the particular alarm graphic element comprises an object and the sub-objects, and wherein the sub-objects are below the object in the hierarchy; and
   instructions for updating the aggregated status of the alarms of the particular one of the alarm graphic elements and then performing a "bubble up" operation of the aggregated statuses to its parent, which combines the parent aggregated status with those of the child wherein, if a child object discovers that its parent object is undeployed, it skips up to the grandparent object and updates it and wherein this skipping goes as many levels as needed until an ancestor is found that is deployed or the area is reached, each object has a set of attributes and flags that summarize the overall status of all alarms on the object and its descendants;

instructions for updating the attributes in two phases:
during an execution phase, the aggregated statuses are updated for alarms on the object itself; and
during the post-execution phase, a scheduler invokes an operation on each object in an area starting at the lowest levels of a hierarchy and working upward;
wherein the manufacturing/process control system being monitored is prompted to implement corrective action based on an alarm priority as indicated by the summarized overall status.

2. The system of claim 1 further comprising instructions for specifying a user-defined hierarchy level for each element above which an alarm is considered severe, instructions for exposing a severe alarm above the user-defined hierarchy level, and instructions for exposing a severe alarm of a particular element when any sub-element within the particular element has a severe alarm.

3. The system of claim 1 wherein the flags and attributes include at least one of:
a flag indicating whether any alarms on the individual object are currently in the alarm state;
an attribute indicating a severity of the urgent alarm(s) on this object and its descendants;
an attribute indicating an alarm mode of the urgent alarm(s) on this object and its descendants;
a flag indicating whether the alarm is presently in the alarm state for the urgent alarm(s) on this object and its descendants;
a flag indicating whether the alarm has been acknowledged for the urgent alarm(s) on this object and its descendants; and
an attribute indicating an array of counts of all alarms that are in the alarm state or waiting to be acknowledged on the object and its descendants, separated by severity.

4. The system of claim 3 wherein at least one of the attributes are kept up-to-date on each object during runtime and the attributes are updated every scan cycle to represent the current statuses of the alarms.

5. The system of claim 1 further comprising instructions responsive to user input for configuring a selected graphic element with a border which is selectively animated in response to an alarm status associated with the selected graphic element being in an alert condition indicating that the one or more aspects of the manufacturing/process control system associated with the selected graphic element is not at an acceptable value.

6. Software instructions stored on a tangible, non-transitory media and executable by a processor, said instructions comprising:
instructions for receiving data indicative of a manufacturing/process control system being monitored;
instructions for displaying a user interface indicative of a status of the manufacturing/process control system being monitored, said status is based on the received data;
instructions for displaying graphic elements as part of the user interface, wherein each graphic element is associated with and indicative of a status of a plurality of alarms of aspects of the manufacturing/process control system being monitored, and wherein the alarm status of each graphic element is a function of the status of its associated plurality of alarms;
instructions for specifying a user-defined level of hierarchy for the plurality of alarms of each element;
instructions for aggregating the status of the alarms of a particular one of the graphic elements;
instructions for exposing a severe alarm associated with the particular alarm graphic element when the status of at least one alarm is above the user-defined level of hierarchy;
instructions for determining one or more sub-objects of the particular alarm graphic element by analyzing the hierarchy of the particular alarm graphic element from the bottom up instead of from the top down, and for exposing an alarm of the determined sub-objects, wherein the particular alarm graphic element comprises an object and the sub-objects, and wherein the sub-objects are below the object in the hierarchy;
instructions for updating the aggregated status of the alarms of the particular one of the graphic elements and then performing a "bubble up" operation of the aggregated statuses to its parent, which combines the parent aggregated status with those of the child wherein, if a child object discovers that its parent object is undeployed, it skips up to the grandparent object and updates it and wherein this skipping goes as many levels as needed until an ancestor is found that is deployed or the area is reached;
instructions for updating attributes, wherein each object has a set of attributes and flags that summarize the overall status of all alarms on the object and its descendants and wherein the attributes are updated in two phases:
during an execution phase, the aggregated statuses are updated for alarms on the object itself; and
during the post-execution phase, a scheduler invokes an operation on each object in an area starting at the lowest levels of a hierarchy and working upward; and
instructions for enabling an alarm prioritization as indicated by the summarized overall status whereby the manufacturing/process control system implements corrective action.

7. The media of claim 6 further comprising instructions for specifying a user-defined hierarchy level for each element above which an alarm is considered severe, instructions for exposing a severe alarm above the user-defined hierarchy level, and instructions for exposing a severe alarm of a particular element when any sub-element within the particular element has a severe alarm.

8. The media of claim 6 wherein the flags and attributes include at least one of:
a flag indicating whether any alarms on the individual object are currently in the alarm state;
an attribute indicating a severity of the urgent alarm(s) on this object and its descendants;
an attribute indicating an alarm mode of the urgent alarm(s) on this object and its descendants;
a flag indicating whether the alarm is presently in the alarm state for the urgent alarm(s) on this object and its descendants;
a flag indicating whether the alarm has been acknowledged for the urgent alarm(s) on this object and its descendants; and
an attribute indicating an array of counts of all alarms that are in the alarm state or waiting to be acknowledged on the object and its descendants, separated by severity.

9. The system of claim 8 wherein at least one of the attributes are kept up-to-date on each object during runtime and the attributes are updated every scan cycle to represent the current statuses of the alarms.

10. The system of claim 6 further comprising instructions responsive to user input for configuring a selected graphic element with a border which is selectively animated in response to an alarm status associated with the selected graphic element being in an alert condition indicating that the one or more aspects of the manufacturing/process control system associated with the selected graphic element is not at an acceptable value.

11. A method for managing human machine interface (HMI) applications for industrial control and automation, said method comprising:
receiving data indicative of a manufacturing/process control system being monitored;
displaying a user interface indicative of a status of the manufacturing/process control system being monitored, said status is based on the received data;
displaying graphic elements as part of the user interface, wherein each graphic element is associated with and indicative of a status of a plurality of alarms of aspects of the manufacturing/process control system being monitored, and wherein the alarm status of each graphic element is a function of the status of its associated plurality of alarms;
specifying a user-defined level of hierarchy for the plurality of alarms of each element;
aggregating the status of the alarms of a particular one of the graphic elements;
exposing a severe alarm associated with the particular alarm graphic element when the status of at least one alarm is above the user-defined level of hierarchy;
determining one or more sub-objects of the particular alarm graphic element by analyzing the hierarchy of the particular alarm graphic element from the bottom up instead of from the top down, and for exposing an alarm of the determined sub-objects, wherein the particular alarm graphic element comprises an object and the sub-objects, and wherein the sub-objects are below the object in the hierarchy; and
updating the aggregated status of the alarms of the particular one of the graphic elements and then performing a "bubble up" operation of the aggregated statuses to its parent, which combines the parent aggregated status with those of the child wherein, if a child object discovers that its parent object is undeployed, it skips up to the grandparent object and updates it and wherein this skipping goes as many levels as needed until an ancestor is found that is deployed or the area is reached;
wherein each object has a set of attributes and flags that summarize the overall status of all alarms on the object and its descendants;
updating the attributes in two phases:
during an execution phase, the aggregated statuses are updated for alarms on the object itself; and
during the post-execution phase, a scheduler invokes an operation on each object in an area starting at the lowest levels of a hierarchy and working upward; and
enabling an alarm prioritization as indicated by the summarized overall status whereby the manufacturing/process control system implements corrective action.

12. The method of claim 11 further comprising specifying a user-defined hierarchy level for each element above which an alarm is considered severe, exposing a severe alarm above the user-defined hierarchy level, and exposing a severe alarm of a particular element when any sub-element within the particular element has a severe alarm.

13. The method of claim 11 wherein the flags and attributes include at least one of:
a flag indicating whether any alarms on the individual object are currently in the alarm state;
an attribute indicating a severity of the urgent alarm(s) on this object and its descendants;
an attribute indicating an alarm mode of the urgent alarm(s) on this object and its descendants;
a flag indicating whether the alarm is presently in the alarm state for the urgent alarm(s) on this object and its descendants;
a flag indicating whether the alarm has been acknowledged for the urgent alarm(s) on this object and its descendants; and
an attribute indicating an array of counts of all alarms that are in the alarm state or waiting to be acknowledged on the object and its descendants, separated by severity.

14. The method of claim 13 wherein at least one of the attributes are kept up-to-date on each object during runtime and the attributes are updated every scan cycle to represent the current statuses of the alarms.

15. The method of claim 11 further comprising configuring, responsive to user input, a selected graphic element with a border which is selectively animated in response to an alarm status associated with the selected graphic element being in an alert condition indicating that the one or more aspects of the manufacturing/process control system associated with the selected graphic element is not at an acceptable value.

* * * * *